US012729582B2

(12) United States Patent
Bodurka et al.

(10) Patent No.: US 12,729,582 B2
(45) Date of Patent: Sep. 8, 2026

(54) SMART DOOR, SYSTEM AND METHOD FOR CONFIGURING DOOR AND SYSTEM PERIPHERAL DEVICES

(71) Applicant: Masonite Corporation, Tampa, FL (US)

(72) Inventors: Alex Bodurka, Portage, MI (US); Ben Docksteader, Custer, WI (US); Paul Summerson, Monson, MA (US)

(73) Assignee: Masonite Corporation, Tampa, FL (US)

( * ) Notice: Subject to any disclaimer, the term of this patent is extended or adjusted under 35 U.S.C. 154(b) by 0 days.

(21) Appl. No.: 18/882,126

(22) Filed: Sep. 11, 2024

(65) Prior Publication Data

US 2025/0084692 A1 Mar. 13, 2025

Related U.S. Application Data

(60) Provisional application No. 63/633,648, filed on Apr. 12, 2024, provisional application No. 63/581,918, filed on Sep. 11, 2023.

(51) Int. Cl.

*E06B 7/28* (2006.01)
*G06V 20/52* (2022.01)
*H04L 12/28* (2006.01)
*H04N 7/18* (2006.01)

(52) U.S. Cl.

CPC ................ *E06B 7/28* (2013.01); *G06V 20/52* (2022.01); *H04L 12/282* (2013.01); *H04N 7/181* (2013.01); *H04N 7/186* (2013.01)

(58) Field of Classification Search

CPC .... G06V 20/52; G06V 10/56; G06V 2201/07; G08B 13/19645; G08B 13/19682; G08B 13/196; H04N 7/185; H04N 7/181; H04N 21/85

See application file for complete search history.

(56) References Cited

U.S. PATENT DOCUMENTS 5,212,907 A 5/1993 Van Sandt
7,824,200 B2 11/2010 Bryla et al.
8,156,671 B2 4/2012 Presley et al.
8,169,169 B2 5/2012 Hass et al.
8,294,302 B2 10/2012 Peabody et al.
8,337,039 B1 12/2012 Larkin
8,354,914 B2 1/2013 Buckingham et al.

(Continued)

FOREIGN PATENT DOCUMENTS

AU 2020101466 A4 8/2020
CN 200968110 Y 10/2007

(Continued)

OTHER PUBLICATIONS

International Search Report and Written Opinion for International Application No. PCT/US2024/046156; International Filing Date Sep. 11, 2024; Report Mail Date Dec. 4, 2024 (12 Pages).

*Primary Examiner* — Jared Walker
(74) *Attorney, Agent, or Firm* — IceMiller LLP

(57) ABSTRACT

Aspects of the present disclosure describe a door, system and method providing a configured smart door platform with plural smart devices provided in one or more of a door slab, an outer door frame and trim or brickmold.

19 Claims, 14 Drawing Sheets

(56) References Cited

U.S. PATENT DOCUMENTS

| | | | | |
|---|---|---|---|---|
| 8,653,982 | B2 * | 2/2014 | Yulkowski | G07C 9/00571 73/493 |
| 8,772,970 | B2 | 7/2014 | Lambrou | |
| 9,290,966 | B2 | 3/2016 | Hanchett, Jr. | |
| 9,652,917 | B2 | 5/2017 | Johnson et al. | |
| 9,704,320 | B2 | 7/2017 | Johnson et al. | |
| 9,922,513 | B1 | 3/2018 | Hall et al. | |
| 10,037,636 | B2 | 7/2018 | Ho et al. | |
| 10,043,332 | B2 | 8/2018 | Scalisi et al. | |
| 10,361,880 | B1 | 7/2019 | Marcinkowski et al. | |
| 10,453,280 | B2 | 10/2019 | Kontturi | |
| 10,664,688 | B2 | 5/2020 | Goulden et al. | |
| 10,691,953 | B2 | 6/2020 | Johnson et al. | |
| 10,733,823 | B2 | 8/2020 | Scalisi | |
| 10,755,509 | B2 | 8/2020 | Saeedi et al. | |
| 10,803,685 | B2 | 10/2020 | Marcinkowski et al. | |
| 10,818,118 | B2 | 10/2020 | Sivalingam et al. | |
| 10,938,250 | B2 | 3/2021 | Ahmed et al. | |
| 10,950,076 | B1 | 3/2021 | Hall et al. | |
| 10,964,138 | B2 | 3/2021 | Geerlings et al. | |
| 10,997,547 | B2 | 5/2021 | Hall et al. | |
| 10,999,092 | B2 | 5/2021 | Marcinkowski et al. | |
| 11,174,666 | B2 | 11/2021 | Demele et al. | |
| 11,244,523 | B1 | 2/2022 | Brady et al. | |
| 11,248,410 | B2 | 2/2022 | Dreyer et al. | |
| 11,290,298 | B2 | 3/2022 | Marcinkowski et al. | |
| 11,339,604 | B2 | 5/2022 | Dreyer | |
| 11,346,141 | B2 | 5/2022 | Gregoriou | |
| 11,346,150 | B1 | 5/2022 | Johnston | |
| 11,352,812 | B2 | 6/2022 | Johnson | |
| 11,373,471 | B2 | 6/2022 | Anderson et al. | |
| D957,688 | S | 7/2022 | Kim et al. | |
| 11,388,373 | B2 | 7/2022 | Scalisi | |
| 11,403,899 | B2 | 8/2022 | Zhang | |
| 11,403,902 | B2 | 8/2022 | Ho et al. | |
| 11,417,200 | B2 | 8/2022 | Hass et al. | |
| 11,441,332 | B2 | 9/2022 | Johnson et al. | |
| 11,532,192 | B2 | 12/2022 | Hass et al. | |
| 11,536,078 | B2 | 12/2022 | Dreyer | |
| 11,539,794 | B1 | 12/2022 | Weber et al. | |
| 11,543,801 | B2 | 1/2023 | Hall et al. | |
| 11,655,669 | B2 | 5/2023 | Hutton et al. | |
| 11,694,287 | B2 | 7/2023 | Marcinkowski et al. | |
| 11,729,014 | B2 | 8/2023 | Marcinkowski et al. | |
| 11,767,710 | B1 | 9/2023 | Johnston | |
| 12,141,130 | B2 | 11/2024 | Gong et al. | |
| 2014/0020295 | A1 | 1/2014 | Bonahoom et al. | |
| 2014/0267739 | A1 | 9/2014 | Ibsies | |
| 2016/0163139 | A1 | 6/2016 | Kankkunen et al. | |
| 2016/0322847 | A1 | 11/2016 | Geiszler | |
| 2017/0040827 | A1 | 2/2017 | Weber | |
| 2017/0358952 | A1 | 12/2017 | Butler et al. | |
| 2019/0132396 | A1 * | 5/2019 | Finnegan | H04L 12/2818 |
| 2019/0146442 | A1 * | 5/2019 | Cirino | E06B 3/92 700/9 |
| 2019/0271186 | A1 | 9/2019 | Chen et al. | |
| 2019/0333302 | A1 | 10/2019 | Kagnew et al. | |
| 2020/0014552 | A1 | 1/2020 | Tan et al. | |
| 2020/0082240 | A1 | 3/2020 | Heitmar | |
| 2020/0204393 | A1 * | 6/2020 | Vashisht | H04L 67/12 |
| 2020/0349786 | A1 | 11/2020 | Ho et al. | |
| 2020/0378172 | A1 | 12/2020 | Lerpard | |
| 2021/0144956 | A1 * | 5/2021 | Bohannon | A01K 27/001 |
| 2021/0207419 | A1 | 7/2021 | Sorice et al. | |
| 2021/0207420 | A1 * | 7/2021 | Sorice | E05D 11/0081 |
| 2021/0207421 | A1 | 7/2021 | Sorice et al. | |
| 2021/0209878 | A1 | 7/2021 | Kim et al. | |
| 2022/0110008 | A1 * | 4/2022 | Knouse | H04W 4/12 |
| 2022/0150347 | A1 * | 5/2022 | Hulbert | G06F 3/165 |
| 2022/0155005 | A1 | 5/2022 | Lee et al. | |
| 2022/0186543 | A1 | 6/2022 | Soderqvist | |
| 2022/0215740 | A1 * | 7/2022 | Eckelkamp | H04N 23/661 |
| 2022/0263297 | A1 * | 8/2022 | Bodurka | E05B 47/00 |
| 2022/0319264 | A1 * | 10/2022 | Anderson | H05K 7/02 |
| 2022/0351722 | A1 | 11/2022 | Mandry et al. | |
| 2022/0392287 | A1 | 12/2022 | Shen | |
| 2023/0010220 | A1 | 1/2023 | Nitidharmatut | |
| 2023/0062621 | A1 | 3/2023 | Cheung | |
| 2023/0077408 | A1 * | 3/2023 | Ordaz | G05B 19/042 340/5.61 |
| 2023/0127500 | A1 * | 4/2023 | Burks | H04L 12/2818 700/19 |
| 2023/0184022 | A1 | 6/2023 | Eliasson et al. | |
| 2023/0393714 | A1 * | 12/2023 | Giuliani | G06F 3/165 |
| 2024/0146046 | A1 | 5/2024 | Gong et al. | |

FOREIGN PATENT DOCUMENTS

| | | | |
|---|---|---|---|
| CN | 103606213 | A | 2/2014 |
| CN | 104105248 | A | 10/2014 |
| CN | 203925102 | U | 11/2014 |
| CN | 205117039 | U | 3/2016 |
| CN | 106761274 | A | 5/2017 |
| CN | 106836990 | A | 6/2017 |
| CN | 206309153 | U | 7/2017 |
| CN | 206329255 | U | 7/2017 |
| CN | 107191110 | A | 9/2017 |
| CN | 107448128 | A | 12/2017 |
| CN | 107575137 | A | 1/2018 |
| CN | 107610390 | A | 1/2018 |
| CN | 107643706 | A | 1/2018 |
| CN | 206903524 | U | 1/2018 |
| CN | 107705511 | A | 2/2018 |
| CN | 107730687 | A | 2/2018 |
| CN | 107747457 | A | 3/2018 |
| CN | 107795255 | A | 3/2018 |
| CN | 107829659 | A | 3/2018 |
| CN | 108118987 | A | 6/2018 |
| CN | 207458156 | U | 6/2018 |
| CN | 108389290 | A | 8/2018 |
| CN | 108399674 | A | 8/2018 |
| CN | 108412359 | A | 8/2018 |
| CN | 108442852 | A | 8/2018 |
| CN | 108661486 | A | 10/2018 |
| CN | 108756617 | A | 11/2018 |
| CN | 108868508 | A | 11/2018 |
| CN | 108915498 | A | 11/2018 |
| CN | 108924015 | A | 11/2018 |
| CN | 108952449 | A | 12/2018 |
| CN | 109098543 | A | 12/2018 |
| CN | 109138774 | A | 1/2019 |
| CN | 109191617 | A | 1/2019 |
| CN | 109191739 | A | 1/2019 |
| CN | 109236134 | A | 1/2019 |
| CN | 109236135 | A | 1/2019 |
| CN | 109267837 | A | 1/2019 |
| CN | 109472902 | A | 3/2019 |
| CN | 208777869 | U | 4/2019 |
| CN | 110009782 | A | 7/2019 |
| CN | 110264682 | A | 9/2019 |
| CN | 209429913 | U | 9/2019 |
| CN | 110409954 | A | 11/2019 |
| CN | 110505182 | A | 11/2019 |
| CN | 110531631 | A | 12/2019 |
| CN | 209990389 | U | 1/2020 |
| CN | 110778265 | A | 2/2020 |
| CN | 111173404 | A | 5/2020 |
| CN | 111270959 | A | 6/2020 |
| CN | 111343432 | A | 6/2020 |
| CN | 111441680 | A | 7/2020 |
| CN | 211038390 | U | 7/2020 |
| CN | 211124167 | U | 7/2020 |
| CN | 111505947 | A | 8/2020 |
| CN | 111540093 | A | 8/2020 |
| CN | 111653025 | A | 9/2020 |
| CN | 111764747 | A | 10/2020 |
| CN | 211851423 | U | 11/2020 |
| CN | 112096221 | A | 12/2020 |
| CN | 112211496 | A | 1/2021 |
| CN | 112267796 | A | 1/2021 |
| CN | 112330869 | A | 2/2021 |
| CN | 112491668 | A | 3/2021 |
| CN | 112539020 | A | 3/2021 |
| CN | 213205374 | U | 5/2021 |

(56) References Cited

FOREIGN PATENT DOCUMENTS

CN 112901047 A 6/2021
CN 113048374 A 6/2021
CN 113129476 A 7/2021
CN 113338772 A 9/2021
CN 113345130 A 9/2021
CN 113545639 A 10/2021
CN 113645446 A 11/2021
CN 113674454 A 11/2021
CN 113706744 A 11/2021
CN 214835862 U 11/2021
CN 214886488 U 11/2021
CN 214943492 U 11/2021
CN 215169563 U 12/2021
CN 113947834 A 1/2022
CN 217240775 U 8/2022
CN 217307315 U 8/2022
CN 115095246 A 9/2022
CN 115164381 A 10/2022
CN 115235096 A 10/2022
CN 115294675 A 11/2022
CN 115324428 A 11/2022
CN 115341821 A 11/2022
CN 115393988 A 11/2022
CN 218454661 U 2/2023
CN 115798084 A 3/2023
CN 116251221 A 6/2023
CN 219197192 U 6/2023
CN 219246122 U 6/2023
CN 116498183 A 7/2023
CN 116760602 A 9/2023
CN 117238059 A 12/2023
DE 202022101334 U1 5/2022
EP 3118405 A1 1/2017
EP 3537398 A1 9/2019
EP 3845729 A1 7/2021
FR 3132160 A3 7/2023
IN 201921017138 A 5/2019
IN 201911049967 A 12/2019
IN 201911048995 A 5/2021
IN 202111053824 A 12/2021
IN 202241020116 A 4/2022
IN 202241026843 A 5/2022
IN 411059 B 11/2022
IN 202111013824 A 12/2022
IN 430120 B 4/2023
IN 202341019331 A 4/2023
JP 6680821 B2 3/2020
JP 2020042440 A 3/2020
JP 6777955 B2 10/2020
KR 20160025226 A 3/2016
KR 20160050965 A 5/2016
KR 20160123639 A 10/2016
KR 20160124481 A 10/2016
KR 101800514 B1 12/2017
KR 20180076537 A 7/2018
KR 20180131716 A 12/2018
KR 101988851 B1 6/2019
KR 20190098719 A 8/2019
KR 20190098720 A 8/2019
KR 102024754 B1 9/2019
KR 102079532 B1 2/2020
KR 102150642 B1 9/2020
KR 20200143302 A 12/2020
KR 20210004253 A 1/2021
KR 20210016726 A 2/2021
KR 20210019211 A 2/2021
KR 20210019216 A 2/2021
KR 20210019218 A 2/2021
KR 20210019241 A 2/2021
KR 20210045195 A 4/2021
KR 20210072510 A 6/2021
KR 20210078199 A 6/2021
KR 102303254 B1 9/2021
KR 102329035 B1 11/2021
KR 102341883 B1 12/2021
KR 20210153308 A 12/2021
KR 20220031428 A 3/2022
KR 102421708 B1 7/2022
KR 20220113136 A 8/2022
KR 20220119878 A 8/2022
KR 102472384 B1 12/2022
KR 102534826 B1 5/2023
TW M627626 U 6/2022
WO 2013163124 A1 10/2013
WO 2016032464 A1 3/2016
WO 2016175910 A1 11/2016
WO 2017024088 A1 2/2017
WO 2018184450 A1 10/2018
WO 2018184452 A1 10/2018
WO 2018184453 A1 10/2018
WO 2018184454 A1 10/2018
WO 2019068021 A1 4/2019
WO 2019162435 A1 8/2019
WO 2020028881 A1 2/2020
WO 2022004989 A1 1/2022
WO 2022010071 A1 1/2022
WO 2022010072 A1 1/2022
WO 2022010073 A1 1/2022
WO 2022010074 A1 1/2022
WO 2022020893 A1 2/2022
WO 2022145966 A1 7/2022
WO 2022263147 A1 12/2022
WO 2023180427 A1 9/2023

* cited by examiner

Smart Door – Mode Selection

FIG. 13

SMART DOOR, SYSTEM AND METHOD FOR CONFIGURING DOOR AND SYSTEM PERIPHERAL DEVICES

CROSS-REFERENCE TO RELATED APPLICATION

This application claims the benefit of U.S. Provisional Patent Application No. 63/633,648 filed Apr. 12, 2024 and U.S. Provisional Patent Application No. 63/581,918 filed Sep. 11, 2023, which is hereby incorporated herein by reference in their entirety.

FIELD

The present technology is directed to exterior or interior doors for residential or commercial buildings, such as for a home, apartment, condominium, hotel room or business, and more particularly to a door, system and method providing a platform for configuring peripheral devices.

BACKGROUND

Typical existing exterior or interior doors for residential or commercial buildings may have a number of electric devices (or components) mounted to the doors in order to provide desired functions, including peripheral devices such as electronic locks and latches, access control systems, doorbells, cameras, intercoms, door state feedback, etc. Also, the market for exterior and interior doors has seen an increasing adoption of additional electric devices including video doorbells, smart locks, LED lighting, smart glass, electromechanical door closers, wireless connectivity electronics, etc. Each of these discrete electric devices typically is an add-on to or near an existing door.

One major drawback with these peripheral devices is their lack of configurability, including fixed/pre-set settings, firmware, etc., which limits user options and prevents upgrades for doors that would otherwise last a long time. Additionally, many door peripheral devices require specialized installation, specific to brand types, often with multiple specific applications and/or hardware interfaces related thereto.

Therefore, there exists a need for a door and methods of operation designed for integration of peripheral devices into the door and in door systems that overcomes the limitations of the prior art.

SUMMARY

The present disclosure generally relates to exterior or interior doors for residential or commercial buildings, such as for a home, apartment, condominium, hotel room or business, and overcomes the above-described and other disadvantages of the art by describing a door, system and method providing a platform for configuring peripheral devices, e.g., to allow for customization of the door and/or system.

Further exemplary embodiments provide for distribution of smart devices in one or more of a door slab, door frame and door trim or brickmold, as well as in other positions remote from a door, door frame and trim.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

FIG. 13 is a flow chart of an exemplary access control system and method;

DETAILED DESCRIPTION

Figure 1:
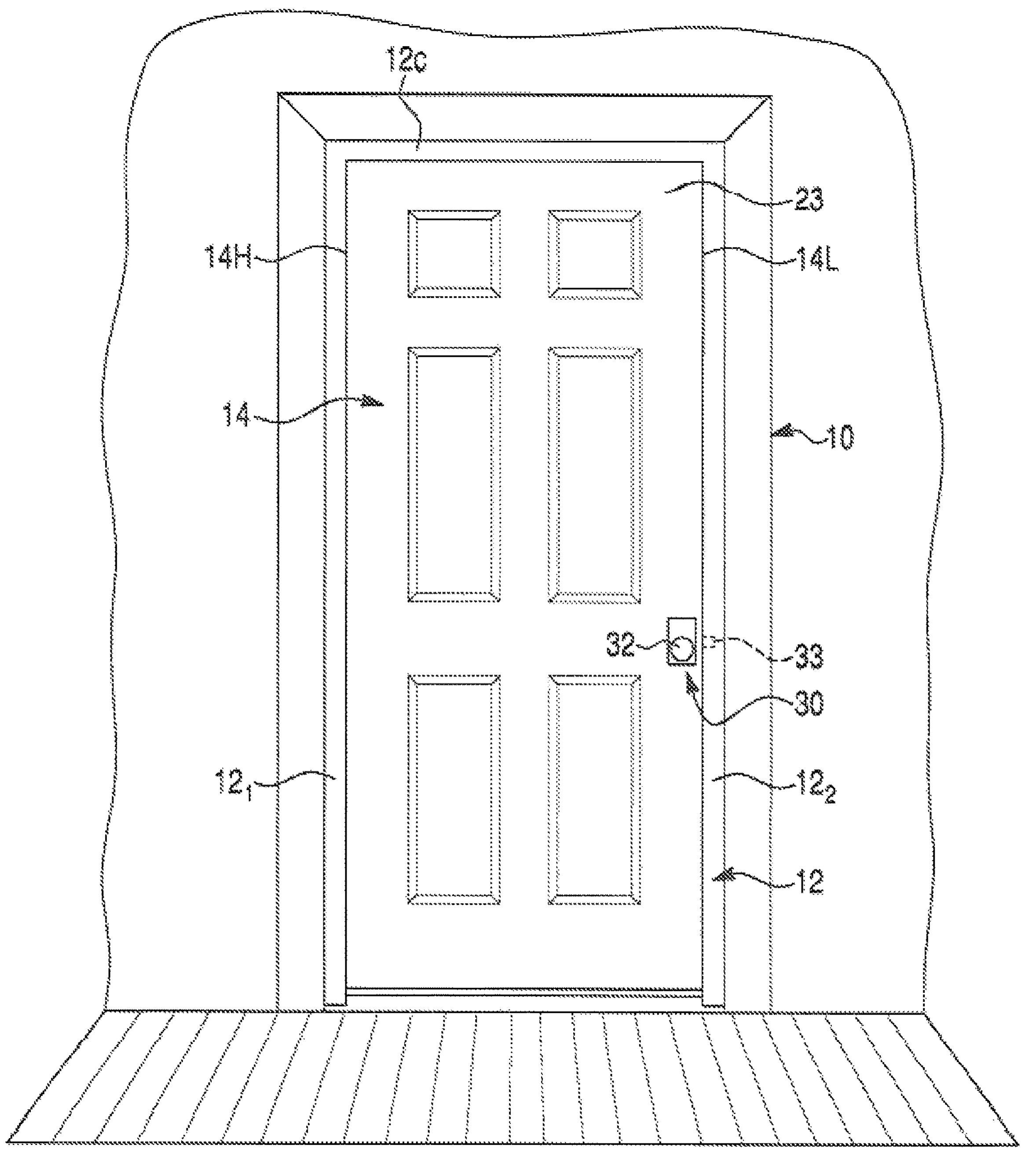
FIG. 1 is an elevational exterior view of an exterior door system according to a first exemplary embodiment of the present invention.

Reference will now be made in detail to the exemplary embodiments and exemplary methods as illustrated in the accompanying drawings, in which like reference characters designate like or corresponding parts throughout the drawings. It should be noted, however, that the invention in its broader aspects is not necessarily limited to the specific details, representative materials and methods, and illustrative examples shown and described in connection with the exemplary embodiments and exemplary methods.

This description of exemplary embodiments is intended to be read in connection with the accompanying drawings, which are to be considered part of the entire written description. In the description, relative terms such as “horizontal,” “vertical,” “front,” “rear,” “upper”, “lower”, “top” and “bottom” as well as derivatives thereof (e.g., “horizontally,” “vertically,” “downwardly,” “upwardly,” etc.) should be construed to refer to the orientation as then described or as shown in the drawing figure under discussion and to the orientation relative to a vehicle body. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. The term "integral" (or "unitary") relates to a part made as a single part, or a part made of separate components fixed (i.e., non-moveable) and connected together. Additionally, the word "a" and "an" as used in the claims means "at least one" and the word "two" as used in the claims means "at least two."

In exemplary aspects, the present disclosure advantageously describes a door, door system and method providing a platform for configuring peripheral devices, e.g., to allow for customization of the door and/or system. Exemplary aspects relate, e.g., to customization of doors as it relates to existing, new or upgraded peripheral components provided within the door or within the door system, e.g., discrete devices, such as cameras, doorbells, locks or latches, authentication devices (including, for example, different types of authentication systems for one or more different types of locks or latches), screens, display surfaces, opening assist systems, alarms, intercoms, lighting, general peripheral (e.g., plug-n-play devices), or other devices for doors, frames or associated door systems. Further exemplary aspects relate to access by a door system controller to third party servers, e.g, Internet of Things (IoT) ecosystem to access or pull data useful for installation, configuration, update, etc. for devices or discrete components thereof for use with the door system to provide a centralized door system interface for a user to allow for customization, upgrade, updates, etc., automatically or manually for a door system user.

Aspects of the present disclosure provide a centralized interface for management or control of peripheral devices, such as are described above, in a door system, and in exemplary aspects discrete components of those peripheral devices (e.g., the camera itself that may be usable in a video doorbell, or the authentication device itself that may be usable in a lock system), as it relates to existing, new (completely new peripheral devices or discrete components thereof), or upgrades to peripheral devices or discrete components thereof.

In exemplary aspects, this management or control of these peripheral devices or discrete components thereof relates to updating of firmware for any aspect thereof, to enabling functionality with the door system, to updating those system aspects, etc., to ensure or improve operability of those aspects (e.g., to make them function or to update them according to brand requirements). Additionally, the door system may receive other software updates. Further, the door system may provide for custom settings of such peripheral devices or discrete components (e.g., setting video parameters, frame rates, color settings, etc., for a camera component), either on top of or to be compatible with particular brand requirements.

In exemplary aspects, such customization may be performed by a control system that is configured to manage peripheral devices (and discrete components thereof) attached thereto, to recognize such devices and components, to allow for users to choose for themselves what devices/discrete components should be a part of their door system and how their door and those devices/discrete components should function.

Exemplary aspects related to the above allow for upgrade of firmware, provisioning of user interfaces for control for existing components. In one exemplary embodiment, an existing camera already within a door installation is controlled by a control system that is configured to allow installation, setup, updates, etc., of firmware or software for providing compatibility with specific brands of systems using such a camera, and/or to allow for custom setups for the camera itself within that installation, such as color, hue, frame rate, or other camera functions or settings.

Relating to the foregoing, in exemplary aspects, such discrete peripheral devices/discrete components may also already have core firmware programmed in (e.g., the camera component for a video doorbell system that already has core firmware installed, for video recording, user interface, etc., that is lacking or requires update for the specifics as to which video server/brand server to communicate with). In exemplary embodiments, such device or component or the need for update for operability or improvement is automatically identified and/or chosen via detection, or is manually selected via user interface via the door control system, to activate/further configure/provision the device component according to that brand. In exemplary embodiments, this is via update of the existing firmware to provision for that brand. In such a way, existing hardware (such as an already optimally placed camera, a particularly desired lock hardware, etc.) can even be switched between brands should door changes be made or should system upgrades (within the brand or otherwise) be made. Additionally, this allows users to upgrade smart features of their door systems without having to purchase a new door, remove and install new frame components and devices, etc. In exemplary aspects, this also allows for separation out (to the door system controller) for the user interface from the hardware, or indeed for multiple or all hardware devices or components, improving the user experience.

In further exemplary aspects, the present door system provides a door system that can account for separate applications by incorporating into the door system or by providing a system that also accounts for varying smart home ecosystems (for different devices/brands/etc.) that can be incorporated into the door, e.g., according to user preferences/customizations, without requiring separate installation, deletion or reinstallation of multiple, different applications for the user or without requiring removal of other hardware for compatibility with a new installation of a particular desired device or component thereof.

Another example relates to one or more authentication devices, such as a particular keypad, a camera, a biometric device, etc., that can be paired with or be part of a device such as a latch or lock. In such a scenario, the control system can be configured to do one or more of: automatically recognize such a device or component; automatically provision, configure or update such a device or component or provide a prompt via a user interface to do so; provide a user interface allowing either manual input or varying levels of manual and automatic provisioning, configuring or updating choices for a user for such a device or component; or other functions.

In exemplary aspects, this allows the door system itself (either automatically or via authorization or manual input from a user of the door system, via an application or user interface) to effectively change the brand of already existing components in the door, allow for provisioning of one or more central door system user interfaces related to or usable with brand components (inclusive of interfacing with those brand servers or pulling brand firmware, software, updates), etc.

In exemplary aspects described herein, the door system and controller related thereto provides a system that allows for plug-n-play swapping of peripheral devices or discrete components thereof to improve performance, aesthetics, to provide general updates or newer features, etc. In exemplary aspects the device or device components (such as a camera, camera assembly, associated hardware, and other devices and components) can be integrated with or access various IoT ecosystems to pull relevant data (e.g., firmware, software, etc.) to update existing or to enable the newly swapped devices or components. Installing or swapping components may be facilitated using further slot aspects described below, to allow simple sliding out or sliding in of peripheral devices or components from uniform or customized open spaces in the door such that sliding in of the devices or components connects the devices e.g., to a wiring harness or pin connector, and sliding out the devices or components disconnects them from the same.

In exemplary embodiments, the door system connects to a brand or partner's IoT ecosystem cloud, and the information contained thereon, for data required to install, update, provision, etc., device or component hardware (existing, newly installed or updated), allowing for a single system, related application and one or more user interfaces, to be used by a door system owner or installer to interact with the door, its smart features and its configuration.

This also lowers the cost of upgrading devices or components that need not be changed out or otherwise upgraded along with other devices or components thereof within the door system.

Certain exemplary aspects will be further described below, with reference to the FIGURES.

Figure 2:
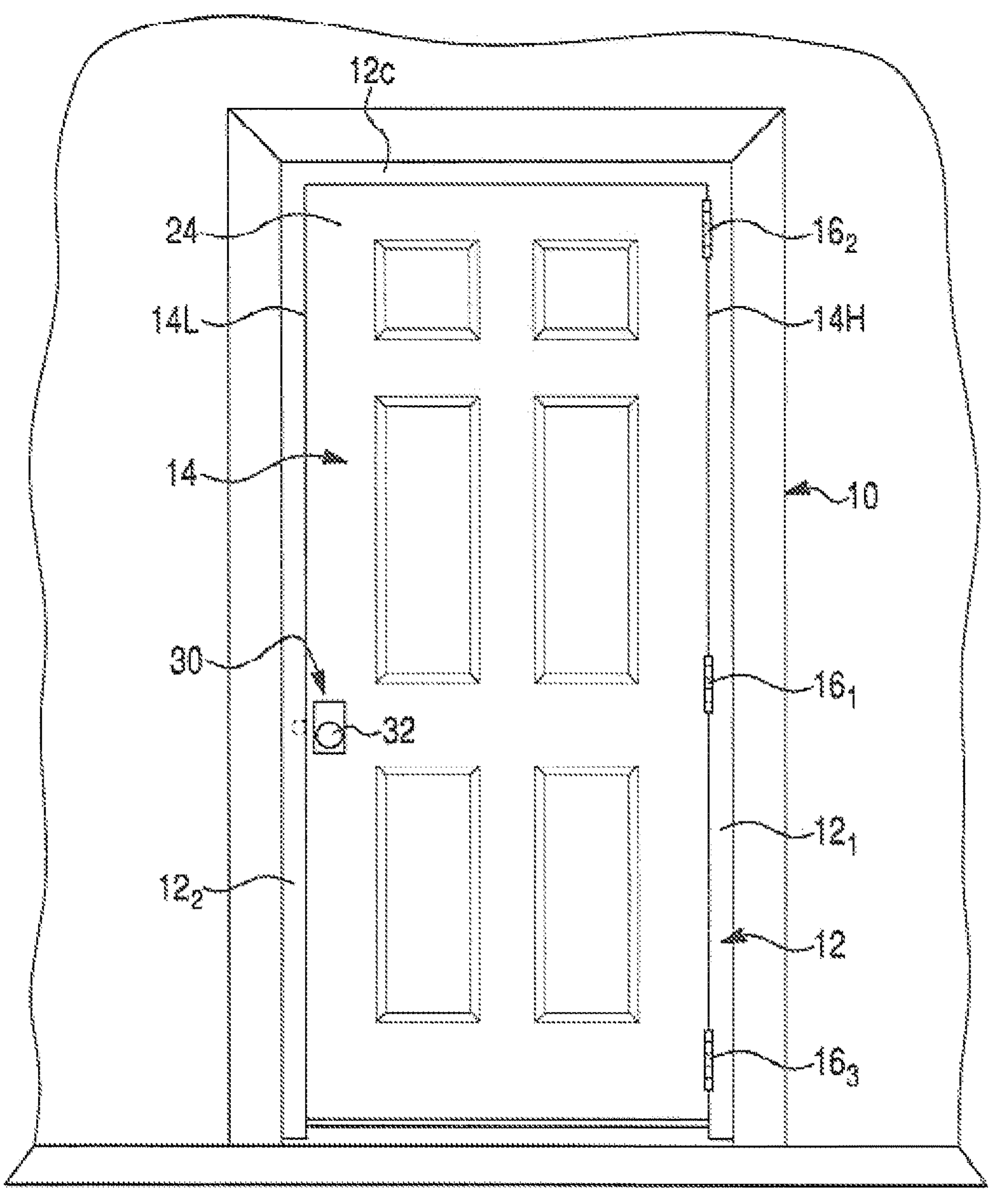
FIG. 2 is an elevational view of the interior side of the door system according to the first exemplary embodiment of the present invention.

FIGS. 1 and 2 illustrate a door system 10 according to a first exemplary embodiment of the present invention, such as a pre-hung door. The door system 10 includes a conventional hinged residential exterior door assembly 11, but it should be understood that the door assembly 11 may be a pivotally mounted exterior or interior door assembly provided for a residential or commercial building, such as a home, apartment, garage, condominium, hotel, office building, or the like. The door assembly 11 may be made of any appropriate material, such as wood, metal, wood composite material, fiberglass reinforced polymer composite or the like. In exemplary aspects, the door assembly 11 includes a rectangular door frame 12 and a door 14 pivotally attached thereto by at least one hinge $\mathbf{16}_1$, such as a "butt hinge" that includes two leaves.

The door frame 12 includes first and second parallel, spaced apart vertically extending jamb members $\mathbf{12}_1$, $\mathbf{12}_2$ and a horizontally extending upper jamb rail member or header 12*c* that connects upper ends of the first and second jamb members $\mathbf{12}_1$, $\mathbf{12}_2$. Those skilled in the art recognize that lower ends of the jamb members $\mathbf{12}_1$, $\mathbf{12}_2$ may be interconnected through a threshold $\mathbf{12}_r$. The at least one hinge $\mathbf{16}_1$ pivotally attaches the door 14 to the first jamb member $\mathbf{12}_1$. Typically, at least two hinges $\mathbf{16}_1$ and $\mathbf{16}_2$ are provided to secure the door 14 to the first jamb member $\mathbf{12}_1$. Preferably, as best shown in FIG. 2, three hinges $\mathbf{16}_1$, $\mathbf{16}_2$, $\mathbf{16}_3$ are used to secure the door 14 to the door frame 12. In the interest of simplicity, the following discussion will sometimes use a reference numeral 16 without a subscript numeral to designate an entire group of the hinges. For example, the reference numeral 16 will be sometimes used when generically referring to the hinges $\mathbf{16}_1$, $\mathbf{16}_2$ and $\mathbf{16}_3$.

Figure 3:
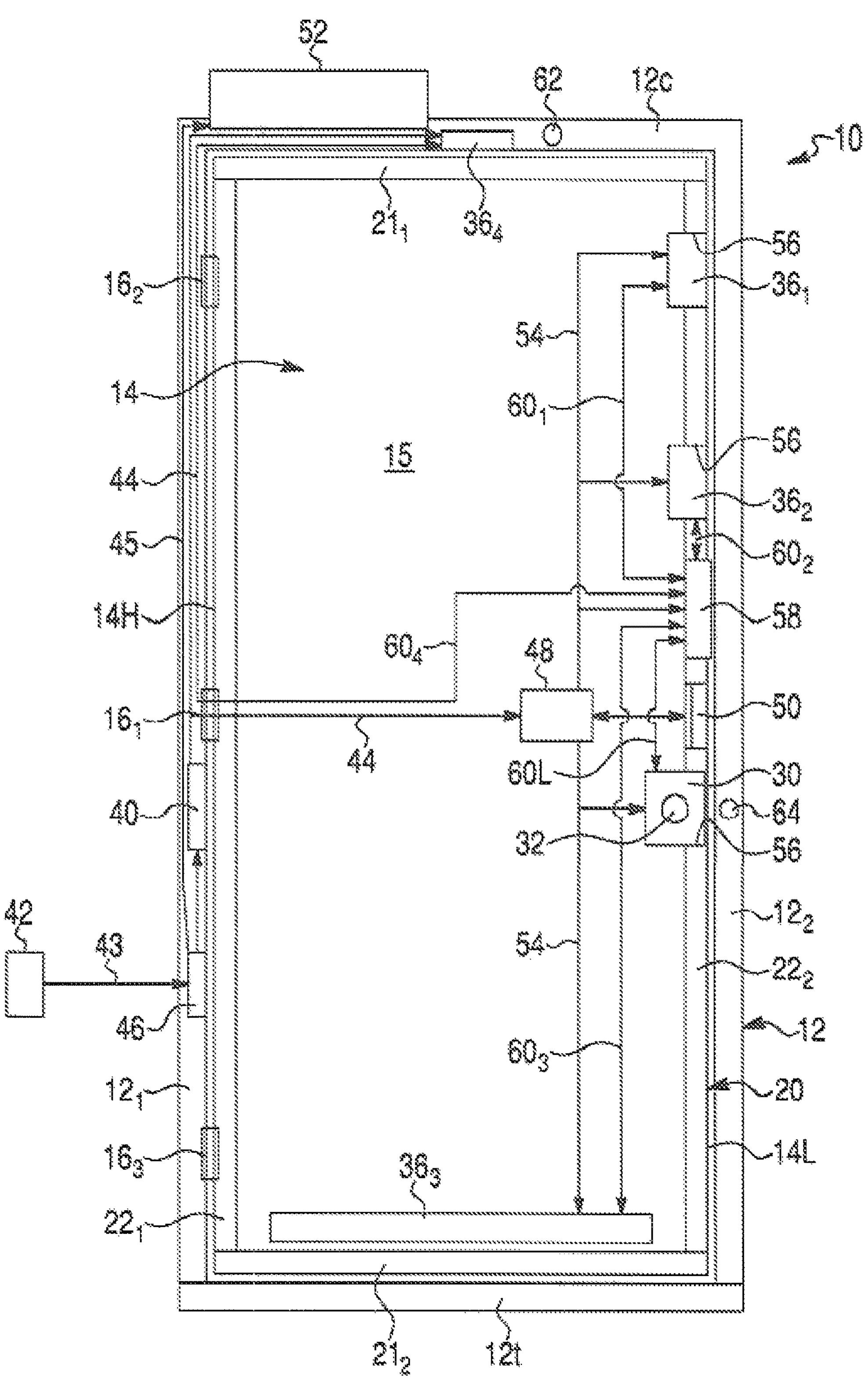
FIG. 3 is an elevational view of the door system according to the first exemplary embodiment of the present invention without an exterior door skin in order to allow observation of the interior of a door.

The door 14 includes a rectangular inner door frame 20, an exterior door skin (or facing) 23, and an interior door skin (or facing) 24 secured to opposite sides of the inner door frame 20, as best shown in FIGS. 1-3. The exterior and interior door skins 23 and 24 are formed separately from one another, and typically are identical in appearance. The door skins 23 and 24 are secured, e.g., typically adhesively, to a suitable core and/or to opposite sides of the inner door frame 20 so that the inner door frame 20 is sandwiched between the exterior and interior door skins 23 and 24. Typically, the exterior and interior door skins 23 and 24 are made of a polymer-based composite, such as sheet molding compound ("SMC") or medium-density fiberboard (MDF), other wood composite materials, fiber-reinforced polymer, such as fiberglass, hardboard, fiberboard, steel, and other thermoplastic materials. The door 14 has a hinge side 14H mounted to the inner door frame 20 by the hinges 16, and a horizontally opposite latch side 14L.

The exemplary inner door frame 20 includes a pair of parallel, spaced apart horizontally extending top and bottom rails $\mathbf{21}_1$ and $\mathbf{21}_2$, respectively, and a pair of parallel, spaced apart vertically extending first and second stiles $\mathbf{22}_1$ and $\mathbf{22}_2$, respectively, typically manufactured from wood or an engineered wood, such as a laminated veneer lumber (LVL). The top and bottom rails $\mathbf{21}_1$ and $\mathbf{21}_2$ horizontally extend between the first and second stiles $\mathbf{22}_1$ and $\mathbf{22}_2$. Moreover, the top and bottom rails $\mathbf{21}_1$ and $\mathbf{21}_2$ may be fixedly secured to the first and second stiles $\mathbf{22}_1$ and $\mathbf{22}_2$, such as through adhesive or mechanical fasteners. The inner door frame 20 further may include a mid-rail. The mid-rail extends horizontally and is spaced apart from the top and bottom rails $\mathbf{21}_1$ and $\mathbf{21}_2$, respectively, and is typically also manufactured from wood or an engineered wood, such as a laminated veneer lumber (LVL). Moreover, the mid-rail may be fixedly secured to the first and second stiles $\mathbf{22}_1$ and $\mathbf{22}_2$. The hinges 16 are secured to the first stile $\mathbf{22}_1$, which defines a hinge stile of the inner door frame 20.

The inner door frame 20 and the exterior and interior door skins 23, 24 of a typical door 14 surround an interior cavity, which may be hollow or may be filled with, for example, corrugated pads, foam insulation, or other core materials, if desired. Thus, the door 14 may include a core 15 disposed within the inner door frame 20 between the exterior and interior door skins 23 and 24. The core 15 may be formed from foam insulation, such as polyurethane foam material, cellulosic material and binder resin, corrugated pads, etc.

The door system 10, according to the first exemplary embodiment, includes a number of DC (i.e., direct current) electric components (devices) mounted to the door 14 of the door system 10 to provide functions, such as electronic access control, door state feedback, entry camera and audio/video communication, etc. Exemplary electric devices that may be mounted to the door 14 of the door system 10 include, but are not limited to, an electric powered door latch 30, a video doorbell $\mathbf{36}_1$, a digital camera $\mathbf{36}_2$, a threshold LED light $\mathbf{36}_3$ and a hallway illumination light $\mathbf{36}_4$ with a motion detector (or motion sensor) or a proximity sensor 62 mounted to the frame assembly 12, as best illustrated in FIG. 3. Specifically, the electric powered door latch 30 is mounted to the inner door frame 20 of the door 14, while the video doorbell $\mathbf{36}_1$, the digital camera $\mathbf{36}_2$ and the threshold LED light $\mathbf{36}_3$ may be mounted to the door frame 12 or to the door 14 of the door system 10, as best illustrated in FIG. 3. Alternatively, the video doorbell $\mathbf{36}_1$, the digital camera $\mathbf{36}_2$, the threshold LED light $\mathbf{36}_3$ or the hallway illumination light $36_4$ may be mounted to the door frame 12 or even adjacent to the frame 12 on a wall of the building. The threshold LED light $36_3$ and/or the hallway illumination light $36_4$ may illuminate when an authorized person is recognized or otherwise identified, or when a person approaches the door 14.

The DC electric devices $36_1$-$36_4$ typically are low-voltage DC electric devices operated by low-voltage DC electrical power. Low voltage direct current (DC) is known in the art as 50 volts (V) or less. Common low voltages are 5 V, 12 V, 24 V, and 48 V. Low voltage is normally used for doorbells, video doorbells, garage door opener controls, heating and cooling thermostats, alarm system sensors and controls, outdoor ground lighting, household and automobile batteries. Many DC electric devices operate at 5 V DC. Low voltage (when the source is operating properly), such as 5 V DC, will not provide a shock from contact. However, a high current, low voltage short circuit (automobile battery) can cause an arc flash and possible burns.

It should be understood that the door system 10 according to the present invention may include other electric devices, as there are a number of electric devices marketed to be mounted to doors and provide functions such as electronic access control, door state feedback, entry camera and communication, etc. In the interest of simplicity, the following discussion will sometimes use a reference numeral without a subscript numeral to designate an entire group of the electric devices. For example, the reference numeral 36 will be sometimes used when generically referring to the electric devices $36_1$-$36_4$.

In exemplary embodiments, during installation of the digital camera $36_2$, the exterior door facing 23 is drilled at a predetermined place to create an opening in the door facing 23 and the core 15 in which the camera $36_2$ may be positioned, for exposing the lens of the digital camera $36_2$ and having the camera $36_2$ observe a field in front of the door system 10. The digital camera $36_2$ may be fixed to the exterior door facing 23 by a bezel (not shown) when the digital camera $36_2$ is received in the door 14. The camera $36_2$ additionally may be mechanically secured within the opening in the door 14, such as through a barbed clip or the like extending from the camera $36_2$ and engaging the interior surface of the door facing 23. Moreover, an exterior bezel around camera $36_2$ prevents humidity, moisture, water or rain penetration inside the door 14. Additionally, the bezel makes unintended removal or disablement of camera $36_2$ more difficult by preventing access to the interior of the door 14.

As best illustrated in FIGS. 1 and 2, the electric powered door latch 30 includes a powered central latch bolt 33 moveable between extended and retracted positions. As best illustrated in FIGS. 1-3, the electric powered door latch 30 is mounted to the latch side 14L of the door 14. Specifically, the electric powered door latch 30 is mounted to the second stile $22_2$, which defines a latch stile of the door frame 20. The electric powered door latch 30 may have a lighted door knob 32 and a lighted keyhole, which illuminate when a user approaches. The handle 32 is manually operable by a user to retract the central latch bolt 33 to allow opening of the door 14 from a closed position to an open position.

Moreover, the door system 10 further comprises an electric door operator (powered door closer) 52 associated with the frame assembly 12 and connected to the door 14, as best shown in FIG. 3. According to the first exemplary embodiment, the powered door closer 52 is mounted to the frame assembly 12. The electric powered door latch 30 is operated at low-voltage DC electrical power, while the electric door operator 52 is operated at high-voltage AC electrical power of 115 volts. The door closer 52 preferably has a base secured to frame 12. An AC motor is secured to the base and an articulating arm has one end connected to the motor and the other end engaged with door 14, so that operation of the arm causes the door 14 to be closed. Alternatively, the electric door operator 52 may also operate at low-voltage DC electrical power.

As illustrated in FIG. 3, the door system 10 further includes an AC distribution unit 46 and a power converter, such as a low-voltage (such as 5 volts (V), 12 volts, 24 volts or other required voltage) AC to DC (AC/DC) converter 40, both mounted to the door 12. As best illustrated in FIG. 3, the low voltage AC/DC converter 40 is located in a pocket machined or otherwise formed into the first jamb member $\mathbf{12}_1$ of the door frame 12, which is adjacent to the hinges 16 and the first stile of the door frame 20, i.e., adjacent to the hinge side 14H of the door 14. While we illustrate the AC/DC converter 40 mounted to the jamb $\mathbf{12}_1$, it may be mounted elsewhere on frame 12. The low voltage AC/DC converter 40 is electrically connected by high voltage wires 43 to a 120 (or 110) V AC power unit 42 installed during home construction or located adjacent the door assembly 11. The low voltage AC/DC converter 40 can be located at a standardized height on the first jamb member $\mathbf{12}_1$ of the door frame 12 so that the AC power unit 42 may be installed during home construction. Due to their close proximity, the AC/DC converter 40 and AC power unit 42 may be easily electrically connected. Alternatively, the low voltage AC/DC converter 40 may be disposed outside the door assembly 11, such as at the wall adjacent the door frame 12. The AC power unit 42 defines a source of high voltage (i.e., 120 (or 110) volts of a standard general-purpose alternating-current (AC) electrical power supply or a high voltage electrical power supply) disposed outside but adjacent the door system 10. Typically, the standard 120 (or 110) volts general-purpose AC electrical power supply is known in the USA as grid power, wall power, or domestic power. Other voltages, such as 220 volts, may be used. The low voltage AC/DC converter 40 after connection to AC power unit 42 converts the standard general-purpose alternating-current (AC) high voltage of 120 V to the low voltage of 5 volts DC, 12 volts DC, 24 volts DC, or other required voltage. Many electric devices operate at 5 volts DC or 12 volts DC, so the AC/DC converter 40 steps down the power and current type to allow typical 120 (or 115) volts general-purpose AC electrical power to be available for use at the door system 10.

The AC distribution unit 46 preferably is located in a pocket (or slot) 47 machined or otherwise formed into the first jamb member $\mathbf{12}_1$ of the door frame 12, which is adjacent to the hinges 16 and the first stile of the door frame 20, i.e., adjacent to the hinge side 14H of the door panel 14. Alternatively, the AC distribution unit 46 may be located in a pocket (or slot) machined or otherwise formed into the upper jamb rail member header 12*c* of the frame assembly 12. Alternatively, the AC distribution unit 46 may be disposed outside the door assembly 11, such as at the wall adjacent the frame 12. The AC distribution unit 46 is electrically connected to the 120 (or 115) V AC power unit 42 installed during home construction and located adjacent the door system 10. The AC distribution unit 46 also is electrically coupled to the low voltage AC to DC (AC/DC) converter 40. In this way, the 120 V AC power is distributed by the AC distribution unit 46 to the low voltage AC/DC converter 40 mounted in the door frame 12, and to at least one other electric device mounted into or on the frame assembly 12, such as the electric door operator 52, through a high-voltage supply wire 45, shown in FIG. 3.

In exemplary embodiments, a module in the frame, e.g., in the header jamb or indeed anywhere in the frame, surrounding trim, brickmold, etc., and which may be the same, a combination of, or in similar positions as module 46 or AC/DC converter 40, is configured to distribute one or both of AC and DC power via different output connections or terminals. Such a system can be advantageous, e.g., in new door constructions or for reconstructions where it is uncertain whether a smart door or smart frame system will be installed, but can at the same time be provided at a low upfront cost during construction (or reconstruction) to provide the option for the future.

The AC/DC converter 40 is electrically connected to the door 14 through an electric power transfer device. A low voltage supply electrical wire(s) 44 runs from the low voltage AC/DC converter 40 to the electric power transfer device, such as one of the hinges $\mathbf{16}_1$, $\mathbf{16}_2$, $\mathbf{16}_3$. Specifically, the low voltage supply electrical wire(s) 44 runs to and through the hinge $\mathbf{16}_1$ disposed usually in the middle of the first jamb member $\mathbf{12}_1$ of the door frame 12 and provides an electric powered (or electric transfer) hinge that conducts the low voltage electrical power therethrough. The low voltage supply electrical wire(s) 44 transfers electrical power across or through the electric powered hinge $\mathbf{16}_1$. Exemplary electrical hinges are disclosed in U.S. Pat. Nos. 3,860,312, 3,857,625, 3,842,386, 3,838,234, 3,355,695, 1,744,040, 61/5,209, 61/2,192 and US published patent application No. 2017/0306674, 2014/0213073, 2014/0001880, 2012/0073083, the complete disclosures of which are incorporated herein by reference.

Alternatively, an electric power transfer device, such as provided by an armored electrical cable, may be used instead of the hinges $\mathbf{16}_1$, $\mathbf{16}_2$, $\mathbf{16}_3$ to transfer low voltage electrical power from the door frame 12 to the pivotable door 14. The low voltage supply electrical wire(s) 44 may pass from the low voltage AC/DC converter 40 in the first jamb member $\mathbf{12}_1$ of the door frame 12 to the pivotable door 14 without using the electric powered hinge, i.e., bypassing any of the door hinges $\mathbf{16}_1$, 162, 163. Exemplary electric power transfer devices are disclosed in U.S. Pat. Nos. 3,848,361, 4,445,299, 6,350,956, 6,812,407, 8,448,382, 8,505,169 and 9,825,443, the complete disclosures of which are incorporated herein by reference. Low voltage DC power is supplied to door 14 in order to minimize the possibility of electrical shock to a user. Further, the electric devices 36 typically are battery operated and thus operate on DC current at relatively low voltages, typically 5 V DC.

The supply electrical wire(s) 44 is connected to the powered hinge $\mathbf{16}_1$ on the hinge side 14H of the door 14 and preferably runs through a horizontal supply channel 27 to a DC power distribution system, such as provided by an electrical distribution block 48, located in or adjacent to the vertical supply passage 25 on the latch side 14L of the door 14. The DC power distribution system 48 transmits low voltage DC power, data, electric signals, or a combination thereof. According to the first exemplary embodiment, the DC power distribution system 48 is disposed in a pocket (or slot) machined or otherwise formed in the inner door frame 20. Electric power can be delivered from the DC power distribution system 48 to the electric devices $\mathbf{36}_1$ and $\mathbf{36}_2$ that are mounted to the door 14, specifically into the latch stile $\mathbf{22}_2$.

In the event the electric devices 36 have connectors for connection to the DC power distribution system 48, the connectors may have a flange or some other unique mechanical identifier to mate with a complementary receptacle in order to identify or designate the connector and thus its electric device 36 as approved for use with the door system 11. Alternatively, the electric devices 36 may have an electronic signature or some other electrical identifier to assure that the electric device 36 is approved for installation. A software handshake is another verification mechanism that may be utilized for electric devices 36.

Low-voltage DC electrical power is delivered from the power distribution system 48 to the electric powered door latch 30 and the electric devices $\mathbf{36}_1$-$\mathbf{36}_3$, and other low power DC electric devices, that are mounted to the door 14 and/or frame. Moreover, the low-voltage DC electrical power is delivered from the low-voltage AC/DC converter 40 directly to the low-voltage electric device $\mathbf{36}_4$ that is mounted to the frame assembly 12 by the low-voltage supply wire 44 so as to bypass the DC power distribution system 48, as shown in FIG. 3.

A plurality of connecting electrical wires 54 electrically connect the DC power distribution system 48 to the electric powered door latch 30, and the electric powered devices $\mathbf{36}_1$ and $\mathbf{36}_2$. Alternatively, electrical connectors may be pre-mounted in the door 14 at desired locations, so that the electric devices 36 may simply be inserted and plugged into electrical connectors. A standard flange size and plug location relative to the location of a flange of the electric devices 36 may be set, so that suppliers may supply electric devices that are easily plugged into the door 14 or door system. The supply electrical wire(s) 44 and the plurality of the connecting electrical wires 54 together define an electrical wire system, which is disposed within the door 14 and is electrically connected to the AC/DC converter 40 and to the DC electric devices 30 and 36. The electrical wire system includes the DC power distribution system and may be in the form of a wire harness electrically connected to the AC/DC converter 40 and to the DC electric devices 30 and 36, and other DC electric devices.

The door 14 allows easy integration of the electric devices 36, while maintaining structural, insulation, acoustic attenuation, and aesthetic requirements of an exterior or interior door. Moreover, slots (or openings) 56, such as of up to 1" in width, may be machined or otherwise formed, such as by molding, into the latch stile $\mathbf{22}_2$ to allow mounting of various electric devices, as best shown in FIG. 3. Specifically, the slots 56 are formed into a peripheral edge of the door 14, such as into an edge 14EL of the latch side 14L of the door 14. Alternatively, one or more of the slots 56 may be formed into the top or bottom rails $\mathbf{21}_1$ and $\mathbf{21}_2$, or into the first stile $\mathbf{22}_1$ of the inner door frame 20. Moreover, the slots 56 open on the peripheral edge of the latch stile $\mathbf{22}_2$. Alternatively, at least one of the slots 56 may be open onto the facings 23, 24 of the door 14.

The connecting wires 54 may be run to the low-voltage power distribution system 48 or connectors may be pre-mounted in the door 14, thus allowing the electric devices 36 to be plugged-in and electrically connected so that electric power can be supplied for use and functioning of the electric devices. Providing electric power to the door system 10 and the door 14 minimizes the need for changing batteries, thus assuring more reliable operation and continuous functioning of the electrical devices.

As illustrated in FIG. 3, the door system 10 further comprises a low-voltage back-up battery (or battery pack) 50 mounted to the door 14, such as to the inner door frame 20. According to the first exemplary embodiment, the back-up battery 50 slides into a pocket formed in one of the stiles (e.g., the second stile $\mathbf{22}_2$) of the inner door frame 20. The battery 50 is electrically connected to the DC power distribution system 48. The battery 50 has a low nominal voltage (such as 5 volts (V), 24 volts or other required voltage). The nominal voltage of the battery 50 corresponds to an output voltage of the low voltage AC/DC converter 40. The door system 10 is powered and operated by the electrical power of the battery 50 as a secondary back-up electrical power source for the powered door latch 30 and the electric devices 36$_1$-36$_4$. Preferably, the battery 50 is also connected to the DC power distribution system 48 for back-up as well as to provide additional amperage for momentary, high amperage devices such as the powered door latch 30. Preferably, the battery 50 is a rechargeable battery that is charged from the DC power distribution system 48. Thus, in the door system 10, the reliance on batteries as a primary power source is less important, or if a battery option is used, a larger consolidated battery 50 may be stored in the door 14 and thus is not required in each of the electric devices.

As illustrated in FIG. 3, the door system 10 further includes an AC distribution unit 46 mounted to the frame assembly 12. The AC distribution unit 46 preferably is located in a pocket machined or otherwise formed into the first jamb member 12$_1$ of the frame assembly 12, which is adjacent to the hinges 16 and the first stile of the door frame 20, i.e., adjacent to the hinge side 14H of the door panel 14. The AC distribution unit 46 is electrically connected to a 120 (or 110) V AC power unit 42 installed during home construction. The AC distribution unit 46 also is electrically connected to a low voltage AC to DC (AC/DC) converter 40 located in a pocket machined or otherwise formed into the first jamb member 12$_1$ of the frame assembly 12, which is adjacent to the hinges 16 and the first stile of the door frame 20, i.e., adjacent to the hinge side 14H of the door panel 14. In this way, the 120 V AC power is distributed by the AC distribution unit 46 to the low voltage AC/DC converter 40 mounted in the frame assembly 12, and to at least one other electric device mounted into or on the frame assembly 12, such as the electric door operator 52, through the high-voltage supply wire 45, shown in FIG. 3.

As illustrated in FIG. 3, the door 14 of the door system 10 further comprises a central electronic control unit (ECU) (or power management controller) 58 configured to be programmed to receive an input signal from one or more sensors, such as the motion sensor (or motion detector) 62 (in wireless communication with the central ECU 58), a proximity sensor, or a smoke detector. The power management controller 58 sends commands to the electric devices 36$_1$-36$_4$, the electric powered door latch 30, and also information to the homeowner. The power management controller 58 preferably is an electronic controller having firmware and/or associated software suitable for assuring operation of the ECU and its interaction with the electric devices 36 and associated sensors, if any. Similarly, one or more sensors may be provided to not only turn-on the LED light(s) but to allow the electric powered door lock 30 to lock after determining that the individual has passed through the door 14 and the door 14 is closed, to communicate with a smartphone app to allow the owner to monitor activity around the door system 10, to determine the status of the door 14, whether open or closed, and to determine whether someone is approaching the door system 10.

In exemplary aspects, the controller 58 or another associated module is also configured to provide for the central control of various or each of the peripheral devices and/or components thereof, such as to update firmware or software therefor, to provide user interfaces for such devices or components, or to reach out to the IoT for data, firmware or software in order to configure, update, initiate, etc., those devices or components as is further described herein.

Figures 4, 5:
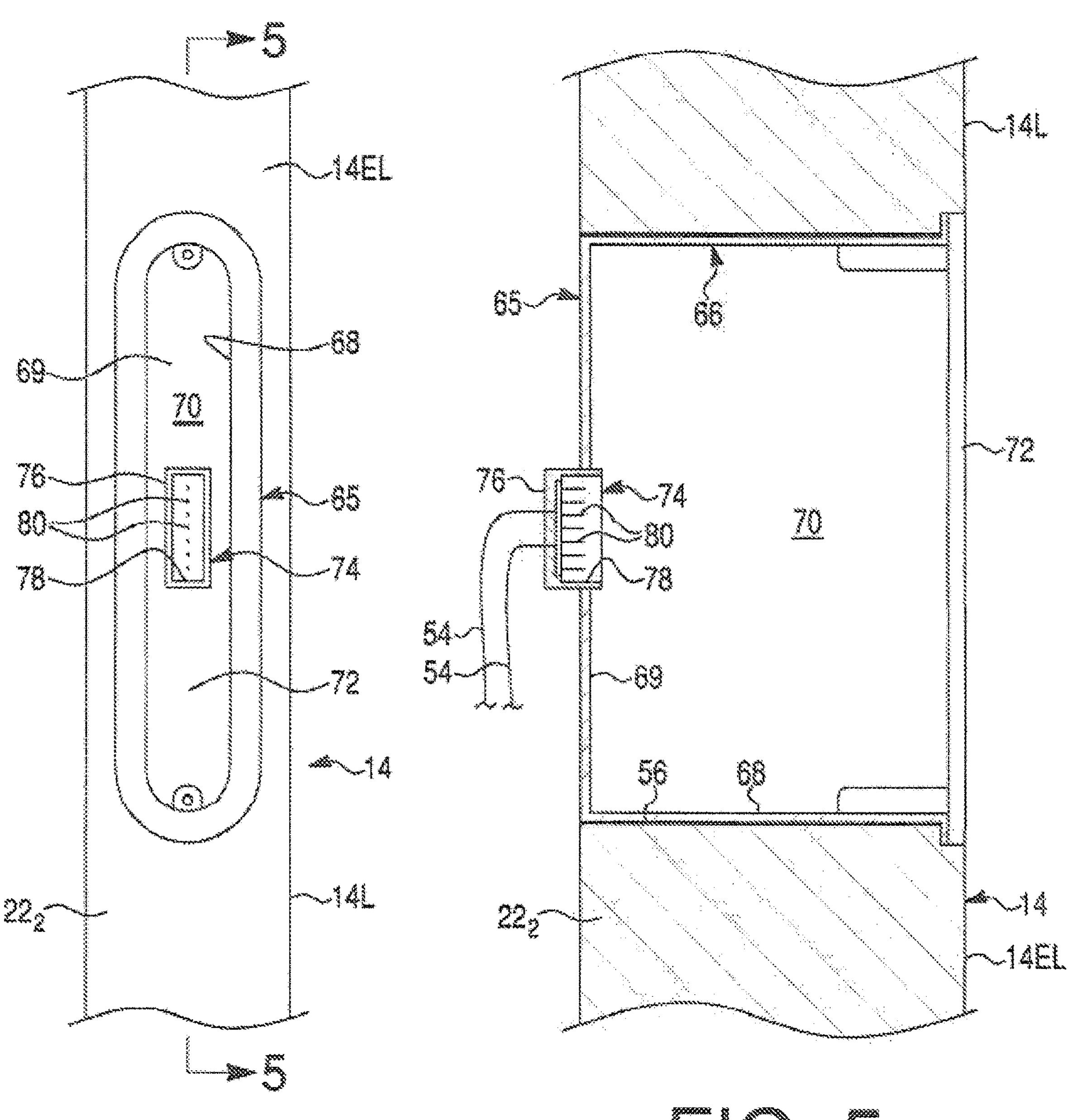
FIG. 4 is a partial elevational view of an edge of a latch side of the door.
FIG. 5 is a cross-sectional view of a second stile of the door taken along the lines 5-5 in FIG. 4.

In exemplary aspects, door 14 is constructed with at least one pre-wired receptacle 65 in which one of the electric devices 30, 36 and/or the battery 50 is releasably mounted. Specifically, one of the electric devices 30, 36 and/or the battery 50 can be removably (or releasably) plugged into the peripheral edge of the door 14, such as into edge 14EL of the latch side 14L of the door 14. In exemplary embodiments, the receptacles 65, best shown in FIGS. 4 and 5, each comprises an insulated housing 66 having a continuous side wall 68 and a bottom wall 69 so as to define an open cavity 70 configured to receive one of the electric devices therein. Thus, the housing 66 of the receptacle 65 has an opening 72 into which one of the electric devices 36 or the powered door latch 30 slides into the cavity 70 of the receptacle 65. As best shown in FIGS. 4 and 5, the prewired receptacle 65 opens on the peripheral edge of the latch stile 22$_2$. Alternatively, the prewired receptacle 65 may open on the facings 23, 24 of the door 14. Plural receptacles 65 may be provided to house plural electric devices.

The housings 66 of the receptacles 65 are molded from a flame retardant polymer or other suitable material that meets the necessary UL and regulatory requirements for housing electrical devices. Ventilation preferably is provided to aid in heat transfer, or a conduit may be connected to the receptacles 65 and vent air out a top of the door 14. The receptacle 65 further comprises a multi-pin electrical socket (or female end) connector 74 including a connector housing 76 defining a socket 78, and a plurality of pins 80 electrically connected to the AC/DC converter 40 through the low-voltage electrical wires 54 of the electrical wire system. While a socket/pin system is shown, those skilled in the art will recognize that various other electrical connector systems, such as USB or HDMI, may be utilized to provide electric power to the associated electric device 36, to allow data transmission from them, and to receive an operating signal, such as to actuate electric powered lock 30.

According to an exemplary embodiment, the receptacle 65 is inserted into one of the slots 56 in the latch stile 22$_2$ of the door 14 as best shown in FIGS. 4 and 5, and fixed therein. In exemplary aspects, each of the electric devices 36$_1$-36$_4$ and the electric powered door latch 30 has a pin-hole electrical plug (or male end) connector complementary to the multi-pin socket connector 74. The pin-hole electrical plug connector includes a plurality of pin-holes complementary to the pins 80 of the multi-pin electrical socket connector 74. Other electrical connection mechanisms may also be utilized. Thus, the electrical plug connector of each of the electric devices 36$_1$-36$_4$ and the electric powered door latch 30 are removably (or detachably, releasably) connectable into the multi-pin electrical socket connector 74 of the receptacle 65 so that the low-voltage electric power can be supplied for use and functioning of the electric devices 36$_1$-36$_4$ and the electric powered door latch 30. Each of the electric devices 36$_1$-36$_4$ and the electric powered door latch 30 thus can be inserted and plugged into the multi-pin electrical socket connector 74 of the associated receptacle 65. Alternatively, the receptacle 65 may comprise the pin-hole electrical plug connector, while each of the electric devices 36$_1$-36$_4$ and the electric powered door latch 30 may comprise the multi-pin electrical socket connector.

The pre-wired receptacle 65 may have a flange or some other unique mechanical identifier associated therewith to mate with a complementary receptacle of each of the electric devices 30 or 36 in order to identify the electrical plug connector and thus its electric device 30 or 36 as approved for use with the pre-wired receptacle 65. Alternatively, the electric devices 30 or 36 may have an electronic signature, electronic handshake or some other electrical identifier to assure that the electric device 30 or 36 is approved for installation. The door system 10 further comprises the electrical or mechanical identifier associated with each of the receptacles 65 and adapted for identifying the DC electric devices 30 or 36 authorized to be mounted within the associated pre-wired receptacle 65. Assuring that the electric devices are approved assures proper operation of the electric devices, maintains regulatory and UL compliance, and minimizes maintenance issues that might arise if unapproved electric devices could easily be installed onto the door system 10. In further exemplary embodiments, the receptacles 65 may each be closed on the open side by a removable cover or have a cut-out portion to allow access to electric devices of various size.

Figure 6:
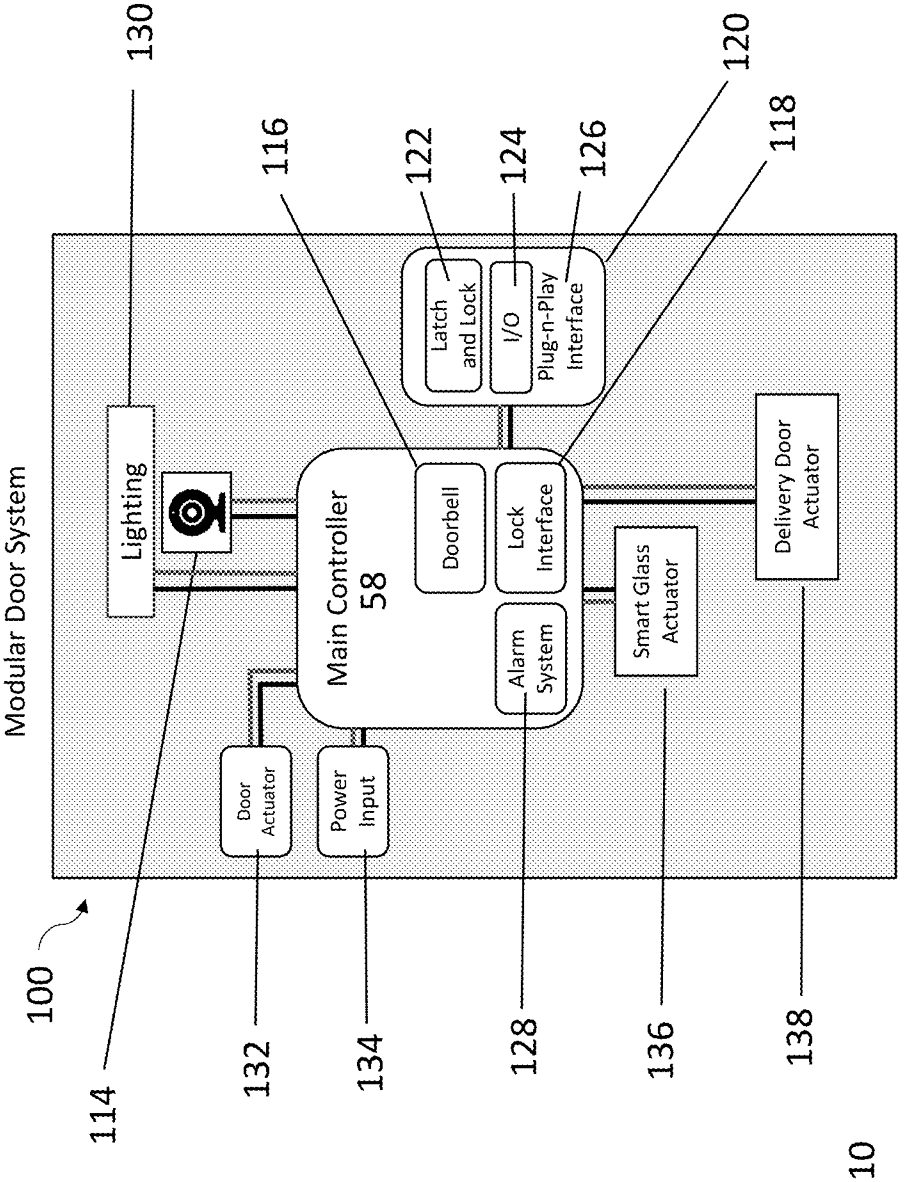
FIG. 6 is a diagrammatic view of a modular door system, in accordance with exemplary aspects described herein.

Referring now to FIG. 6, an exemplary modular door system, shown generally at 100 includes power supply connections 110 and communications channels 112 between a main controller 58 and various devices, including a camera module 114, a doorbell interface 116, a lock interface 118 communicating with a lock interface module 120, which also includes a latch and lock component 122, an I/O component 124 and a plug-n-play interface 126, an alarm system or alarm system interface 128, a lighting component 130, a door actuator component 132, a power input component 134 (AC or DC, with power supplied in the jamb, outside the door system, or via other mechanisms), a smart glass or display component 136 (e.g., to change tint, transparency, provide informational display or user interfaces, etc.), and a delivery door actuator 138 (controlling a door that allows for secure delivery of packages without granting full access).

Figure 7:
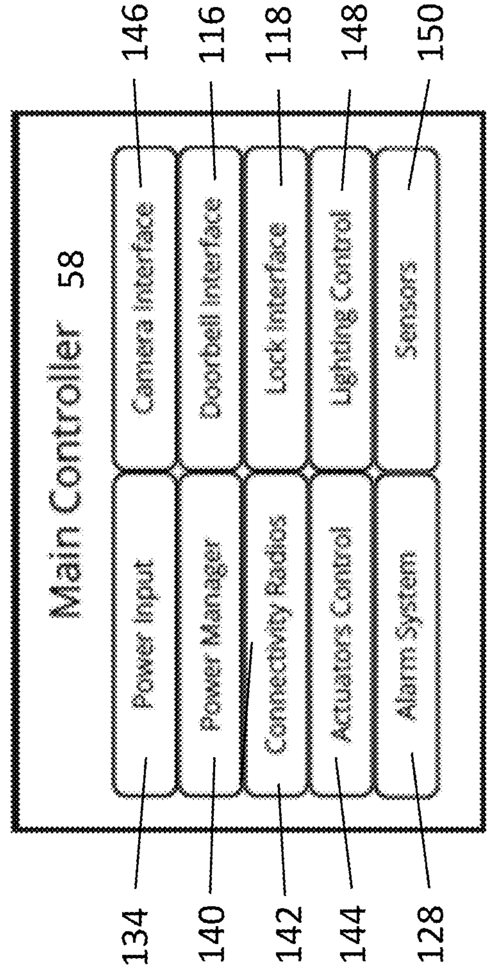
FIG. 7 is a block diagram showing exemplary aspects of a main controller.

Referring now to FIG. 7, an exemplary main controller 58 is shown as being connected to and in operative communication with exemplary devices and component interfaces, including power input 134, power manager 140, connectivity radios 142, actuators control 144, alarm system 128, camera interface 146 (which communicates with camera module 114 shown in FIG. 6), doorbell interface 116, a lock interface 118, lighting control 148 (which communicates with lighting component 130 shown in FIG. 6 that can, e.g., light the entry way for safety, security, aesthetic reasons, etc.), and various sensors 150.

In exemplary embodiments, the controller 58 comprises an assembled printed circuit board (PCBA) that functions according to one or more of: hosting door system software in memory thereon or utilizes such software via a processor; that is configured to manage power for peripherals; that controls an electric lock and latch; that communicates to a partner camera module; that controls actuators, a doorbell interface module, a lock interface and lighting, among others; that interfaces with connectivity radios; that includes or interfaces with sensors, including daylight, motion, door state, latch state, interior, exterior, and temperature sensors, among others; that provides a plug-n-play interface for quick swapping of components, e.g., the doorbell and lock components; and that includes an alarm system, with e.g., a cellular backup and/or other branded alarm or backup system.

Figure 8:
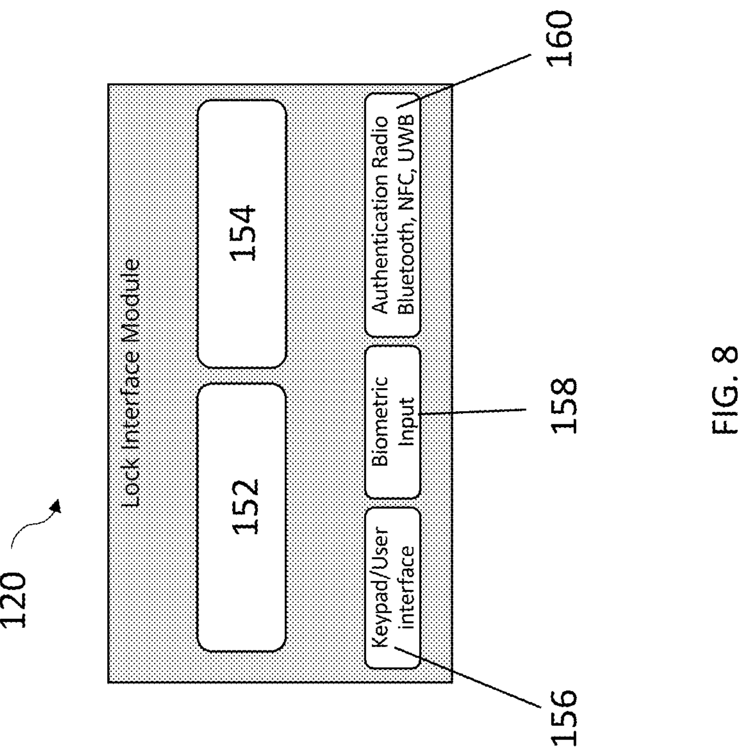
FIG. 8 is a block diagram showing exemplary aspects of a lock interface module.

Referring now to FIG. 8, an exemplary lock interface module 120 includes a first feature or user interface 152, which communicates with component partner control status light emitting diodes (LEDs), audio tones, etc., for a desired particular brand (e.g., providing or configuring light piping based on a brand partner's needs), provides identification and control of cover plates and over the custom look and feel of the desired module product (the user experience (UX) and product identification (ID)). A second feature or user interface 154 provides a plug-n-play feature that allows users to upgrade to different versions. The exemplary lock interface module 120 also includes one or more of a keypad or other user presented interface 156, a biometric input interface 158 and/or a user authentication interface 160 via radio, Bluetooth, near field communication (NFC), ultra wideband (UWB), or some other protocol, among others.

Figure 9:
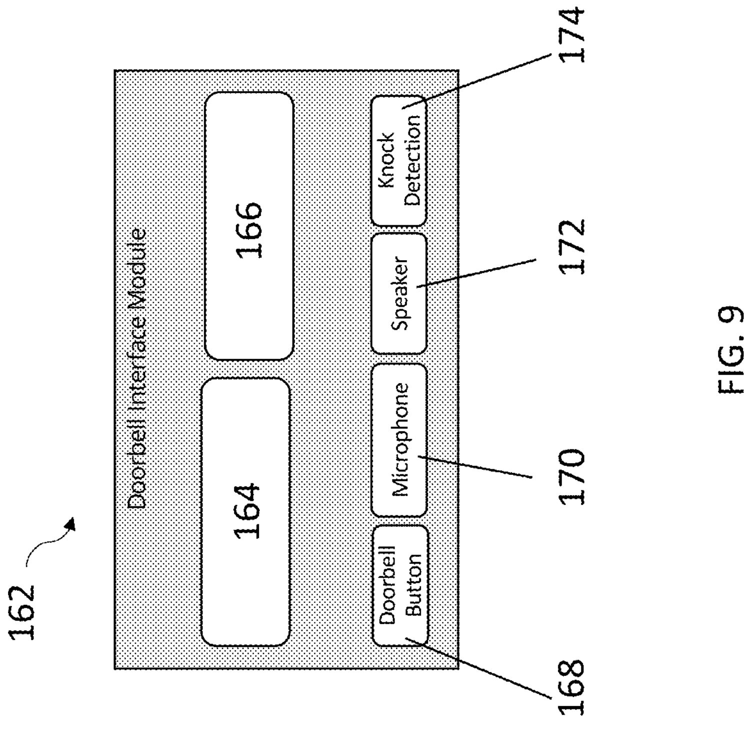
FIG. 9 is a block diagram showing exemplary aspects of a door interface module.

Referring now to FIG. 9, an exemplary doorbell interface module 162 includes a first feature or user interface 164, which communicates with component partner control status light emitting diodes (LEDs), audio tones, etc., for a desired particular brand (e.g., providing or configuring light piping based on a brand partner's needs), provides identification and control of cover plates and over the custom look and feel of the desired module product (the user experience (UX) and product identification (ID)). A second feature or user interface 166 provides a plug-n-play feature that allows users to upgrade to different versions. The exemplary doorbell interface module 162 also includes one or more interfaces for a doorbell button 168, a microphone 170, a speaker 172 and a knock detection component 174, among others.

Figure 10:
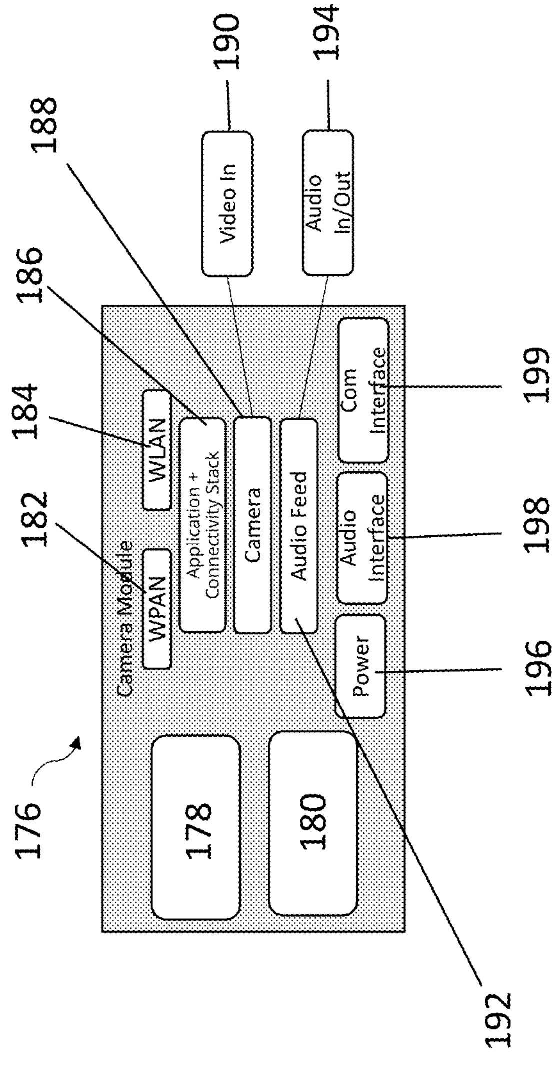
FIG. 10 is a block diagram showing exemplary aspects of a camera module.

Referring now to FIG. 10, an exemplary camera module 176 includes a first feature or user interface 178, which is proprietary with the door system and/or which communicates with component partner control for a desired particular brand. A second feature or user interface 180 provides a plug-n-play feature that allows users to upgrade to different versions of the camera module. The exemplary camera module 176 also includes one or more interfaces for or components of a wireless personal area network (WPAN) communications component 182, a wireless local area network (WLAN) component 184, an application and connectivity stack 186, a camera 188 with video in 190, an audio feed 192 with audio in/out 194, a power toggle 196, an audio interface 198 and a com interface 199, which may communicate with one or more of LED control, smart lock functions, doorbell button/assembly, actuator control, sensors, power status and alarm systems, among others.

Figure 11:
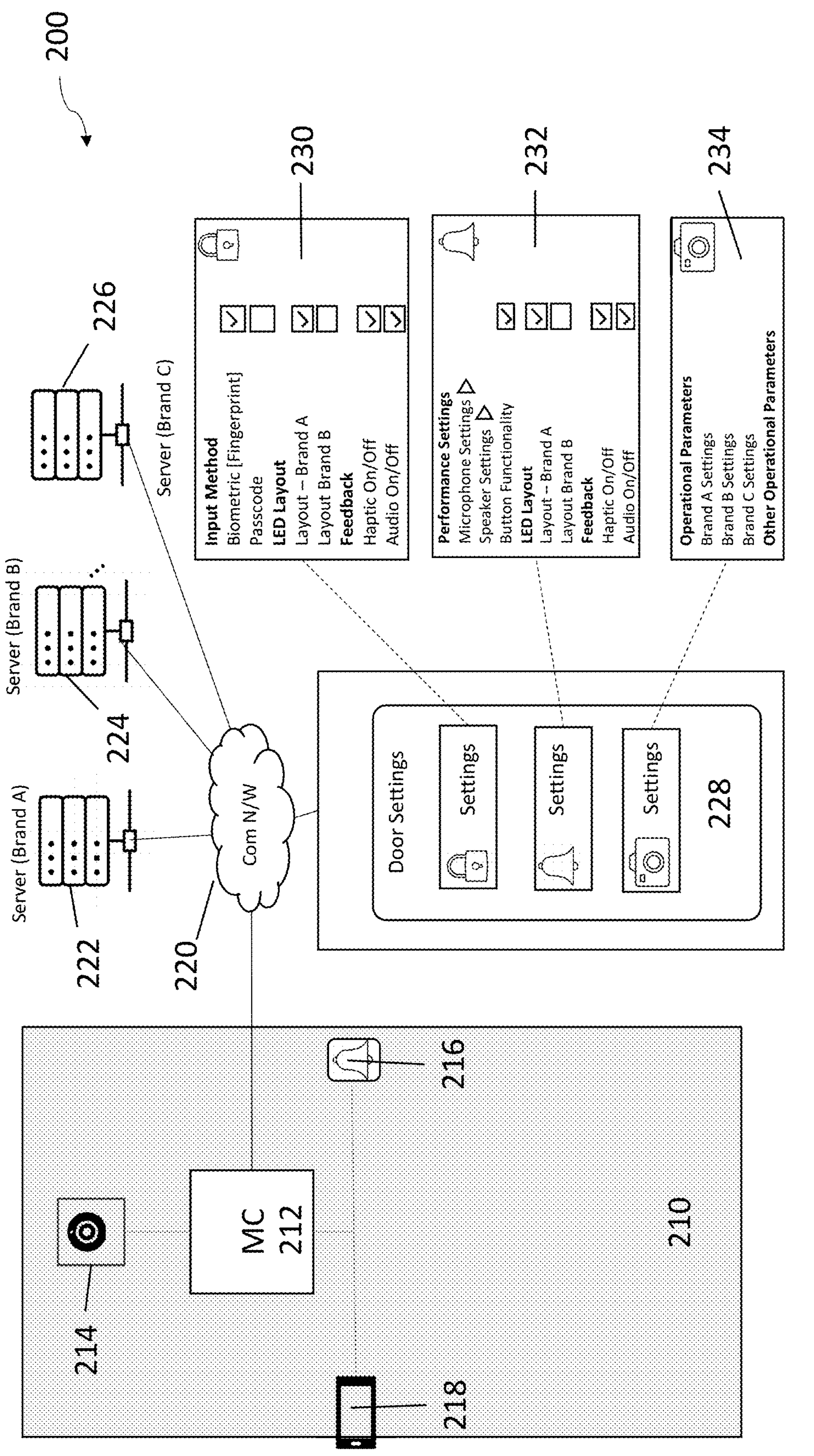
FIG. 11 is a block diagram showing exemplary aspects of a networked door system, with various exemplary user interfaces for customization of devices or components.

Referring now to FIG. 11, an exemplary door controller to cloud arrangement is illustrated generally at 200. An exemplary door 210 is shown with a controller 212 operatively connected to a camera 214, a doorbell 216 and a lock 218. A communications network 220 connects to one or more brand servers (e.g., brand server A at 222, brand server B at 224 and brand server C at 226). An application and user interface 228 related thereto also provides for selectable door and peripheral device settings, e.g., lock settings at 230, doorbell settings at 232 and camera settings at 234. In the illustrated exemplary embodiment, the lock settings 230 allow for selection of input method (e.g., biometric (fingerprint)), passcode, etc.), allow for selection of LED layout, e.g., for different brands (Brand A or Brand B, etc.) and provide for selection of desired feedback (haptic on/off, audio on/off). In the illustrated exemplary embodiment, the doorbell settings 232 allow for selection of performance settings, e.g., for microphone and speaker settings, for button functionality, for LED layout, e.g., according to different brands (Brand A or B) and for feedback (haptic on/off and audio on/off). Also, in the illustrated exemplary embodiment the camera settings 234 allow for operational parameters to be set according to brand (e.g., Brand A settings, Brand B settings or Brand C settings), as well as setting or defining other operational parameters.

Exemplary aspects allow for custom positioning of discrete components for peripheral devices, e.g. positioning the camera (which may be a doorbell camera) itself in a high location, which allows for optimal field of view, with a doorbell button, microphone and/or speaker in the door slab, where a user would naturally knock on the door, etc. Such a system advantageously allows for peripheral devices and components, e.g., with the camera, lock, doorbell modules, to provide for a lower cost system compared to using off the shelf components, which would create a duplication of electrical components. Exemplary aspects of the presently described door system also allows for IoT ecosystem partners to easily integrate with the door system by allowing them to use their existing software and hardware architecture used for their off-the-shelf devices (e.g., video doorbells). Further, if a user desires at a later date to switch to a different IoT ecosystem for a component, they may do so by replacing discrete hardware components. In further exemplary aspects, connecting the IoT ecosystem partner's cloud to the door system allows for a single application to be used by the homeowner, eliminating the need for a user to navigate through sequential configuration and management of multiple device applications.

With regard to exemplary lock module aspects described herein, with management of discrete components, aspects allow for flexibility in the level of security and convenience for unlocking and locking of the door due to the modularity provided by emphasis on discrete components. The desired level of security can change depending on the homeowner/user's preference, where the door is installed (e.g., the main entry, side entry, garage to house, interior secure rooms, etc.). This allows for a customization that provides for easily changing the ways a user can unlock or lock a door.

Figure 12:
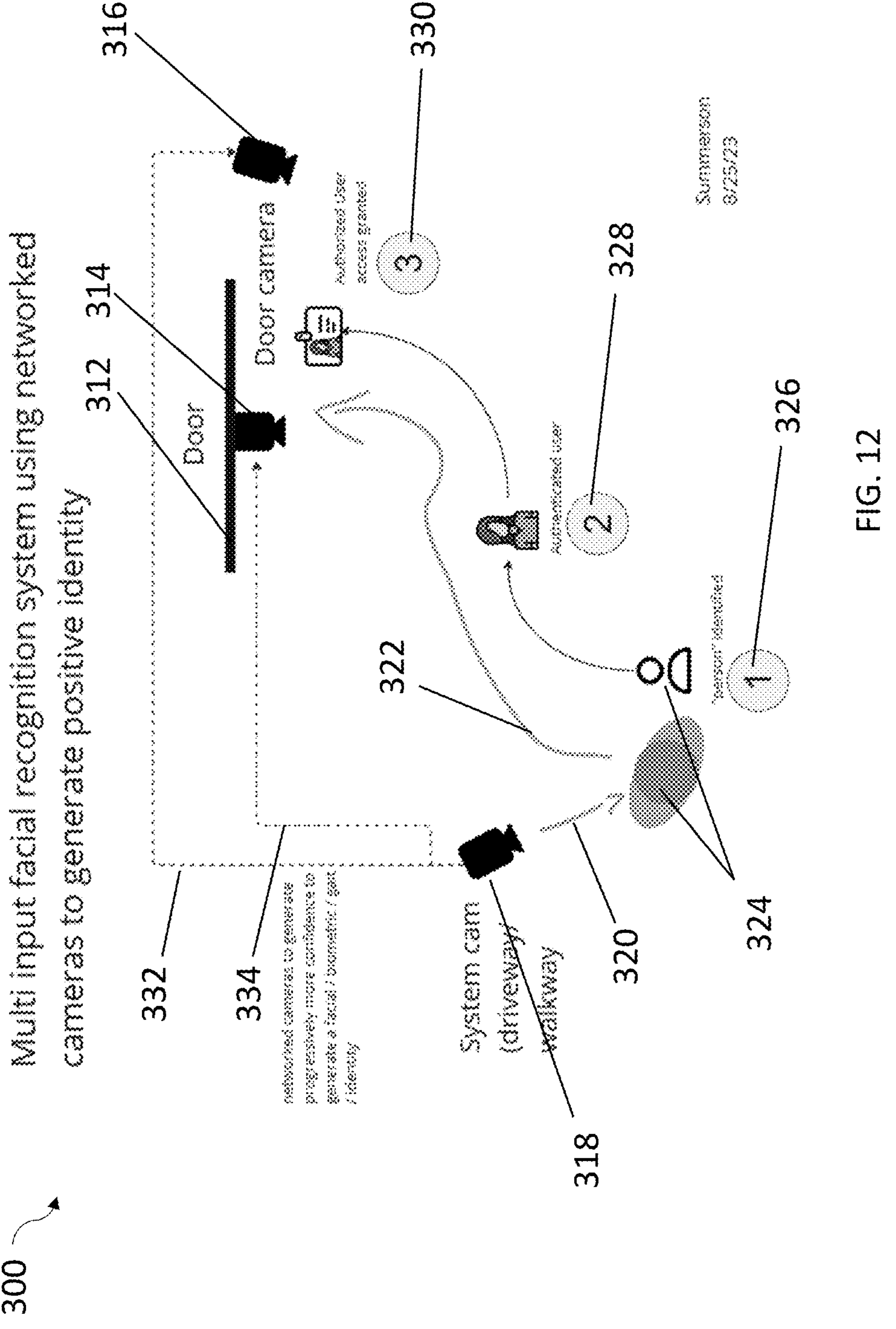
FIG. 12 is a schematic of an exemplary multi-input facial recognition system.

Turning now to FIG. 12, an exemplary multi-input facial recognition system is generally illustrated at 300. A door 312 includes a camera, which can be mounted to a portion of the door or frame (at 314) and/or off the door or frame (near the door or frame or further off, but with a view to an area external the door (at 316), as well as one or more cameras that has a different view (at 318), e.g., with a view 320 for a driveway, walkway or other path (e.g., at path 322) that a user 324 may take to approach the dwelling.

Referring still to FIG. 12, three exemplary steps are illustrated for identification, authentication and access using an exemplary multi-input facial recognition system in accordance with the above or with variations thereof (note also that recognition need not be restricted to facial recognition, but can be other types of user recognition, e.g., body, gesture, biometric, gait, or other user-specific parameters or identification). At step 1, illustrated at 326, a person 324 (or pet, etc.) is identified first or at least preliminarily or partially by the camera 318 (e.g., in the driveway or on a walkway or lawn). Authentication is either partially or fully performed as that user 324 approaches the door 312 (shown at step 2, illustrated at 328), with authorization of the user at step 3, illustrated at 330) at or near the door.

Referring again to FIG. 12, cameras 318 and 314 and/or 316 are networked via wireless or wired connections, e.g., at 332, 334, to the other cameras and/or to a controller for the door or door system, such as controller 58 in FIG. 3, above.

Such exemplary multi-input systems advantageously facilitate automation of entry into a space, e.g., allowing a mechanized door system to automatically unlock and open, upone generating a positive ID of a person or persons approaching the access door system. Gaining a rapid positive facial identification within a short amount of time (as someone closely approaches a door) can be difficult, with difficulty potentially compounded due to environmental conditions (rain, fog, glare, etc.) or other factors that may impede recognition process (not a full view of the user, a user wearing hats, bulky clothes, etc.). By utilizing more than a single point camera for identification, which single point camera is limited according to viewing angle and position of the door in any given home environment, positive identification of a user as well as time to positively identify an approaching user is advantageously improved. Multiple cameras, views or angles advantageously provides a higher certainty and a more secure match relative to that single point verification.

Using an exemplary distributed system (noting that the system can either be physically distributed or be provided as an array of cameras within a door or door system) increases the ability of the system to generate an identification as the user naturally moves through the environment during approach to the access system. As we have noted, exemplary systems also contemplate aggregate identity attempts by the system during identification efforts, e.g., using more biometric points from the side of the head, face or body to broaden the definition of a user's identity.

Further exemplary embodiments provide for identification and authentication of in-home service providers. As will be described in more detail immediately below, such exemplary embodiments can address fundamental needs related to, e.g., liability concerns for the providers of the in-home service personnel and trust concerns for a resident (e.g., only wanting to grant access to trusted individuals or organizations.

In exemplary embodiments, the system is configured to recognize a universally unique identifier (UUID), such as a badge that can be worn or carried by an in-home service provider (e.g., package deliver, maintenance technician, etc.). An exemplary UUID badge can be captured by a smart door system (or any access system, e.g., a package portal) via a sensor, e.g., an optical scanner, a radio module, etc., which allows the system to authenticate either: a) the individual; or b) the company they work for.

In further exemplary embodiments, once authenticated, the smart door can then grant access if that individual or company is authorized for accessing the residence. The smart door system can automatically detect the presence of the UUID badge; or it can be manually controlled to start scanning for a UUID based on manual control (local or remote control) of a user (such as pressing a button on the door or pressing a button in a mobile application).

In exemplary embodiments, the UUID badge is static, meaning that the UUID does not change (such as a printed label with a QR code). In other exemplary embodiments, the UUID badge is dynamic, meaning that the UUID can change either automatically or by a manual event that changes the content of the UUID. One exemplary dynamic UUID includes a badge that uses an E-ink (or other) display to show a QR Code, which can be updated automatically or dynamically in exemplary embodiments.

Exemplary methods for delivering the contents of the UUID badge to the smart door system include, but are not limited to: an RF-based badge that broadcasts (via unidirectional communication) the contents of the badge using radio frequencies that are received by the door system using a matching RF receiving device; an RF-based badge that communicates (via bi-directional communication) the contents of the badge using radio frequencies received by the door using a matching RF communication device; and optical based badges that display the contents of the UUID on a surface that can then be scanned by the door system via an optical-based sensor, among others.

Exemplary automatic events for updating or displaying (a UUID does not always have to be present) the UUID of a dynamic UUID badge include, without limitation: a challenge response; a time-based schedule; location based updating or displaying; or event based updating or displaying, among others.

With regard to an exemplary challenge response, the dynamic UUID badge can be automatically updated or displayed to provide a response to a particular challenge that is communicated to the badge by the door system. An example of this is a UUID badge first displaying a UUID that represents the company. Then, based on which company is identified, the door can then communicate a challenge that requires the badge to provide a UUID of the individual wearing the badge. It should be noted that the foregoing is just one example of a challenge/response contemplated herein, with other challenges or responses that could be used. Exemplary challenges/response pairings contemplated herein advantageously allows for an additional level of security, since the response (second UUID) is not present unless a specific challenge is presented, thus allowing for greater security controls and privacy of the second UUID. Only authentic UUID badges will be able to provide the correct response to the challenge.

With regard to exemplary time-based schedules, the dynamic UUID badge can be automatically updated or displayed after a period of time.

With regard to exemplary location-based updating or displaying, the dynamic UUID badge can be automatically updated or displayed based on the physical location of the UUID badge.

With regard to exemplary event-based updating or displaying, the dynamic UUID can be automatically updated or displayed based on a particular event. Nonlimiting examples of such events are: a job order; a delivery order; or other events that are specific to the in-home service order that is being processed at the time of access.

One nonlimiting example of a manual event for updating or displaying the UUID of a dynamic UUID badge include: manual pressing of a button on the badge itself by an in-home service provider. For example, after every service event, the service provider updates the UUID (so that it is not used more than once) by pressing the button. In another example, the service provider presses the button and the UUID is only displayed temporarily.

Other exemplary manual operations for a dynamic UUID badge include triggering by a remote user. This may operate similarly to what is described as a manual event immediately above, but instead of the in-home service provider pressing a local button, the UUID will only be displayed or updated based on the trigger by a remote user (e.g., without limitation, an in-home service provider system administrator, a homeowner, etc.).

Nonlimiting examples of UUID badges include: an E-ink or other display; a security token/fob; a mobile phone (an app running on a phone); a QR or barcode on an article of clothing; and a QR or barcode on a badge.

Exemplary embodiments utilizing such UUID components advantageously allow for scalable authentication methods that do not require capturing biometrics of an in-home service provider (or delivery person, etc.). This facilitates implementation of systems that adhere to privacy regulations (e.g., general data protection regulation (GDPR)), while still providing trust/safety to the homeowner, as well as liability assurances to the in-home service provider. Additionally, such systems are more secure than e.g., providing a pin code or key that could be used by the in-home service provider. Further, such systems advantageously provide a good compromise between security and convenience for the homeowner, as well as a good compromise between liability concerns and convenience for the in-home service provider.

Figure 13:
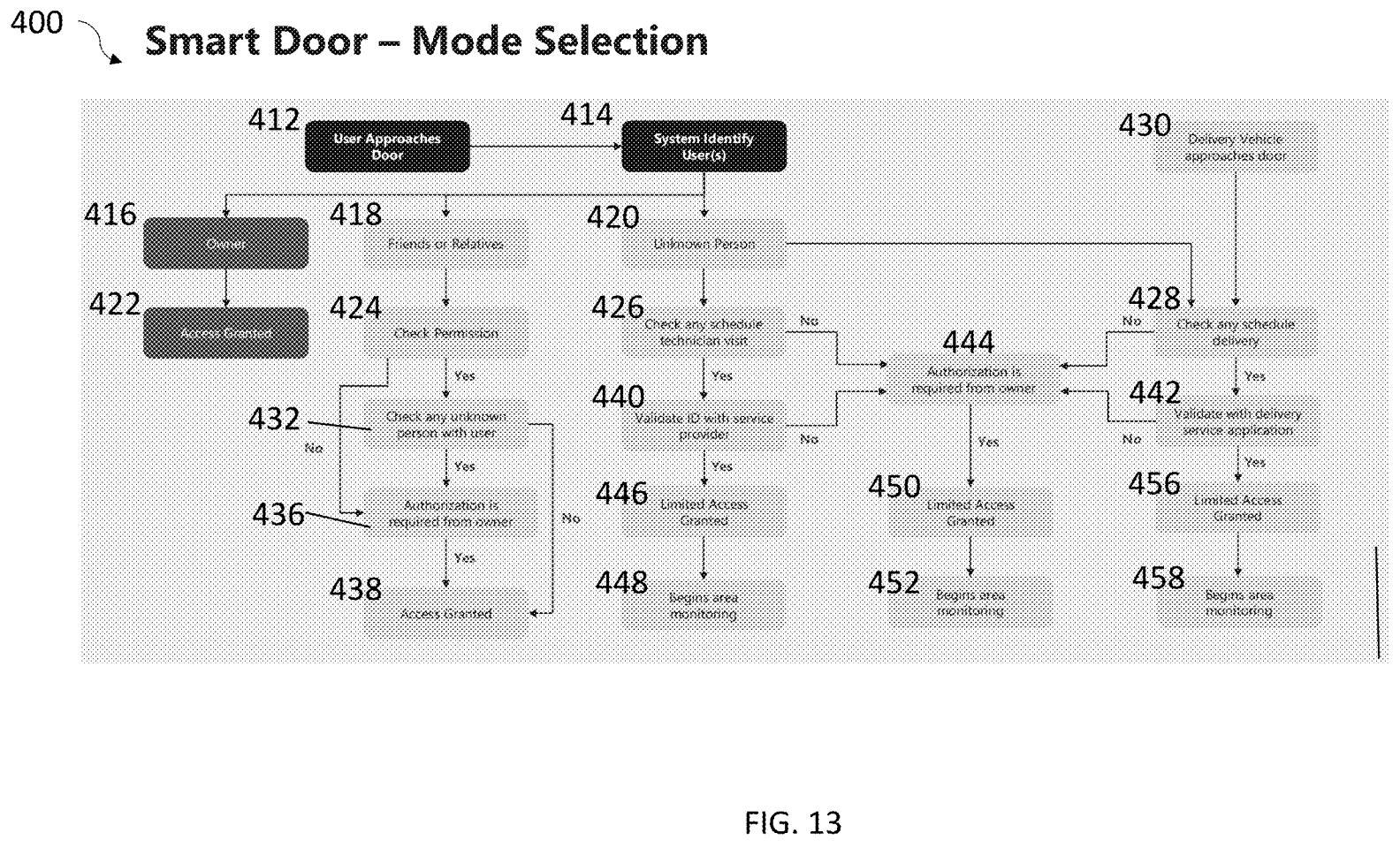

FIG. 13 illustrates a flow chart of an exemplary access control system and method, shown generally at 400, in accordance with embodiments described herein. At box 412, a user approaches the door or door system. At box 414, the system identifies the user. In exemplary aspects, if that user is an owner, as at box 416, access is granted at box 422.

In further exemplary aspects, if that user is a friend or relative, as at box 418, permission(s) are checked at box 424. If the permission(s) are satisfied, the system may also be configured to check any unknown person with the user, as at box 432, with any further authorization from the owner being illustrated at box 436. Access grant for that friend or relative (and possibly for additional guests) is illustrated at box 438.

In further exemplary aspects, authorization for an unknown person 420 and/or a delivery vehicle/person 430 may include a number of possible steps, e.g., for an unknown person, checking any scheduled technician visit at box 426, validating an unknown person with an identification via a service provider at box 440, checking any scheduled delivery at box 428, validating a person or delivery via a delivery service application at box 442 and/or requiring authorization from the owner at box 444.

Limited access is granted at box 446 for an unknown user that has passed the steps for boxes 426 and 440, with optional area monitoring (or personnel monitoring) at box 448. Limited access is also granted at box 450 for owner authorized entry, with optional area monitoring (or personnel monitoring) at box 452. Limited access is also granted at box 456 for a delivery vehicle/user that has passed the steps for boxes 428 and 442, with optional area monitoring (or personnel monitoring) at box 458.

With regard to exemplary alarm systems, such systems can be separate or built in (which can be a logical location for the control panel, providing good signal strength for a cellular or other backup, particularly when the door is partially outside).

Figure 15:
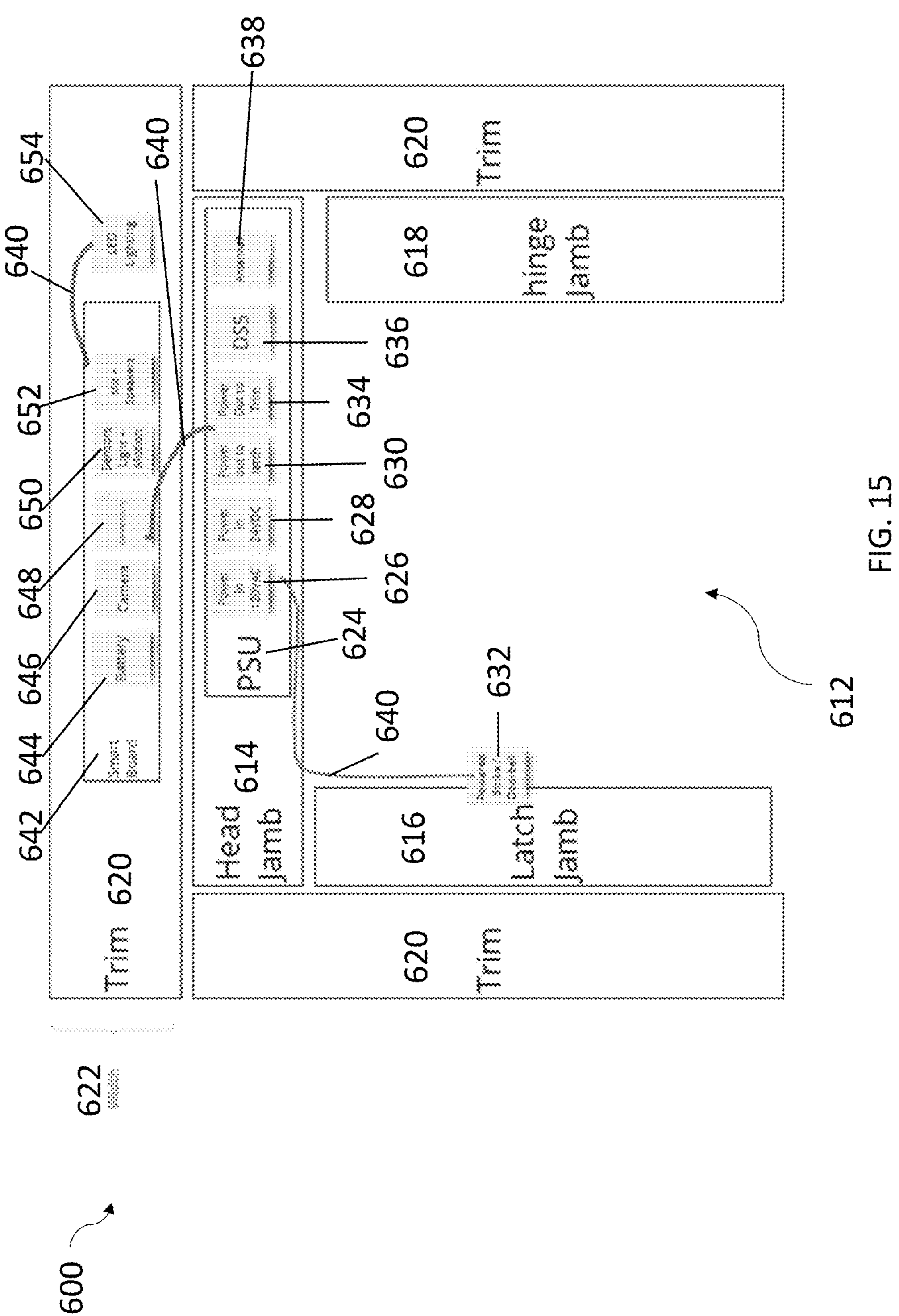
FIG. 15 is a diagram of an exemplary distributed smart door system positioning components in both frame and trim components.
Figure 18:
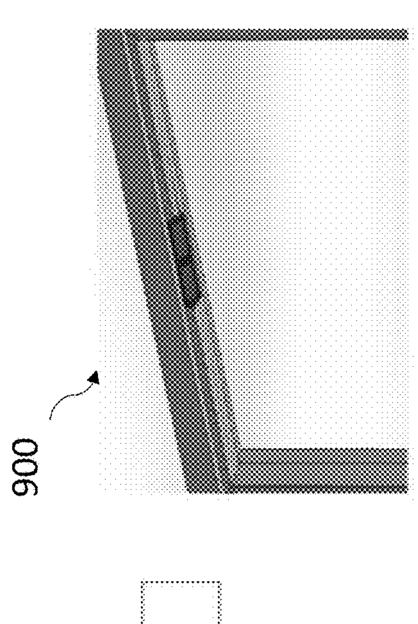
FIG. 18 is a perspective view of an exemplary distributed smart door system, positioning components in the head jamb only.
Figure 17:
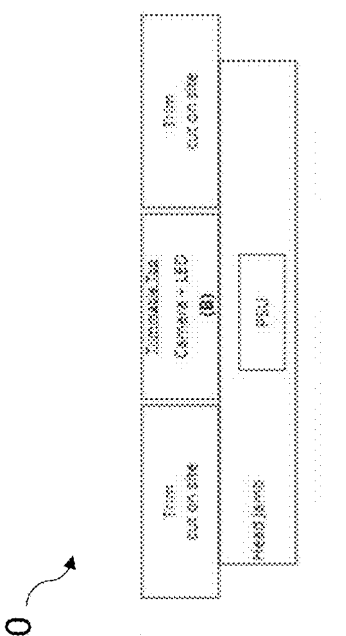
FIG. 17 is a diagram view of an exemplary distributed smart door system positioning components in both frame and trim components, with trim cut on site around an I/O module including a camera and LED.

We have noted above, e.g., with regard to various cameras, security system components, power components, etc., that various components of the system can be external to the door slab, e.g., in the frame or off the door or frame (near the door or frame or further off). In line with that and with above descriptions, in exemplary embodiments, various components are provided in trim or brickmold. In further exemplary embodiments, these components can be connected, via wired or wireless connection for one or both of data and power, to components in the frame and/or the door slab. FIG. 15 illustrates an exemplary embodiment, shown generally at 600, combining components in the frame 612 (e.g., the head jamb 614 and latch jamb 616, though components could also be placed in the hinge jamb 618) and the trim or brickmold 620. In exemplary embodiments, components in the trim can be configured to fit within standard trim, e.g., within a standard width illustrated at 622.

In the illustrated exemplary embodiment shown in FIG. 15, an exemplary power supply unit (PSU) 624 is provided (e.g., in a pocket) in the head jamb 614. The illustrated PSU includes a power in connector for 120 volts, alternating current (VAC) 626, a power in connector for 24 volts direct current (VDC) 628, a power output connector 630 to a latch 632 (or a doorbell, strike, etc.) in latch jamb 616 (we note that this output can be any voltage and type, e.g., 24 VDC, or can be multiple discrete connections to components in the jamb, part of a connections hub, etc.), a power output 634 to the trim or brickmold (again, this can be multiple discrete connections, different voltages, part of a hub, etc.), a door state sensor (DSS) 636 and an optional antenna 638. While not shown, a wireless power and/or data module may be additionally provided (or provided in the alternative to various wired connections, with lines 640 representing general wired or wireless connections). We also note that the PSU can be combined with an AC/DC converter to provide DC output, without requiring a separate DC input.

Referring still to FIG. 15, exemplary trim components (within 620) include an exemplary smart board 642 including or connected to a battery 644, a camera 646, a connectivity module or component 648, sensors for light and/or motion 650, microphones or speakers 652, as well as components for e.g., LED lighting 654. We note that these are simply exemplary components. In exemplary embodiments, various components can be added on to or removed from a connected lineup of components, e.g., using individual modules with one or more components that can be connected to one another for power and data for customizing the content within the trim or brickmold. Further, such modules can actually be configured to replace sections of and attach to adjoining sections of traditional trim or brickmold (e.g., to add a camera or lighting component at a desired position around the door system) or to other custom smart trim or brickmold components. To that end, each module can have a standard power and/or data connection that allows a slide in, snap in, proximity or other connection when placed next to a smart board, power supply, battery, etc., within trim or brickmold or as a replacement section for trim or brickmold. Additionally, any replacement sections can be offered in a variety of colors or with a trim or brickmold shell of a variety of colors to match existing trim or brickmold (which can also be wood or composite).

In exemplary embodiments in line with the above, an exterior facing I/O module can include components such as a video camera, two-way audio, motion and/or daylight sensors, LED lighting for the door area, LED indicator lights, etc. In further exemplary embodiments, potentially movable components, e.g., cameras, can be provided with adjustable aspects (or can be fixed).

Further, as we have noted, certain exterior or interior modules or components (including, e.g., door openers) may require AC (e.g., 120 VAC) and/or DC power; and connections may be provided accordingly.

Positioning of various components in the frame/jambs can be in pockets that are of any desired shape. Those pockets can also extend to inner portions of the head jamb, e.g., going under weatherstripping to provide a retaining surface (with screws or other methods), such that a given module cannot be removed unless the door is open.

While FIG. 15 illustrates a certain exemplary configuration, other configurations are contemplated herein. For example, in one configuration, a head jamb has a pocket or pockets to contain connection points, the PSU, DSS and possibly the battery, all in interior portions of the jamb (e.g., all in the head jamb above the door, though of course other jambs could also contain components), with an exterior brickmold of several styles mounted to the head jamb, with pockets to contain an I/O module, lighting and possibly a battery.

In another exemplary configuration, a head jamb has pocket(s) to contain connection points, the PSU, DSS and possibly a battery, all in the interior portion of the head jamb, with an exterior self-contained I/O module mounted in line with brickmold, and including lighting and possibly a battery. Standard brickmold can be installed on each side of the I/O module.

In another exemplary configuration, a head jamb includes pocket(s) to contain connection points, the PSU, DSS and possibly a battery, all in the interior portion of the head jamb, with further pocket(s) to contain the I/O module, lighting and possibly the battery, all in an exterior portion of the jamb. The I/O module housing can extend to an inner portion of the head jamb, as noted above, under weatherstripping such that the module cannot be removed unless the door is open.

Figure 16:
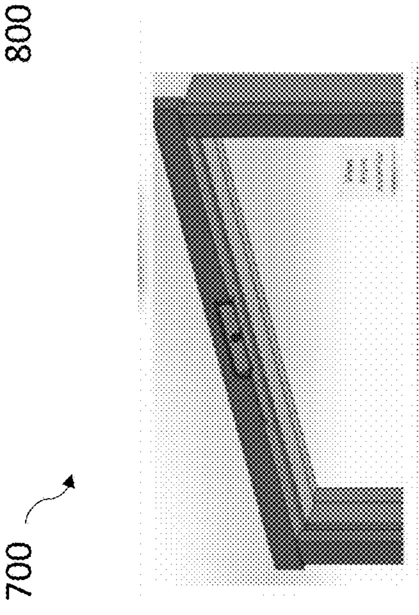
FIG. 16 is a perspective view of an exemplary distributed smart door system, positioning components in both frame and full width trim components.

In exemplary embodiments, with regard to use of both a head jamb and full width smart trim, as shown generally at 700 in FIG. 16, products enable use for inswing, outswing and sliding doors with good structural integrity. With regard to use of head trim, an I/O module and standard trim as shown generally at 800 in FIG. 16, products enable use for inswing, outswing and sliding doors with good structural integrity, additionally noting that one SKU will work with any length door/sidelite size, as trim can be cut on site to fit around the I/O module. With regard to use of the head jamb only as shown generally at 900 in FIG. 19, we note that the product works with or without use of trim/brickmold, and with any style of the same.

Also as noted above, certain exemplary connections for components to power connection points and/or to each other can be by wiring with connectors, by connectors to a PC-backer board (PCBB) or by other connection types.

Advantages of various of the exemplary configurations described herein include physical integration of features of several individual smart security and/or convenience components into one door frame component, which every house already has, bringing aesthetic benefit to the exterior and to the interior of the door system. A further physical advantage includes the ability to use the system with left-handed and right-handed doors without increasing part count or assembly for complexity (since various components are in the head portion of the door system).

Further exemplary advantages relate to the user experience and software, with integration of features of several individual smart security and/or convenience components into one product, creating interplay between them that cannot be achieved otherwise. An example includes lighting that changes based on door state, lock state, identification of user(s) approaching, night video purposes, etc.

A further exemplary advantage relates to power, e.g., with hard-wired connections if used providing a better user experience than changing/charging of batteries (this being apart from wireless power usage), all components being connected to continuous power. Further, in exemplary embodiments, a single connection point can be provided for power needed for all components, again connected to continuous power. With further reference to power, we have also noted that AC wiring or DC wiring can be contemplated herein, providing power options for new construction and for remodeling. We note that to the extent that DC wiring is used, a licensed electrician is not needed. A further exemplary advantage relates to the optional use of one or more backup batteries, with some or all features being able to run on battery power if mains power fails.

Another exemplary advantage relates to performance, where use of a Bluetooth or wifi antennae for an exterior-mounted I/O module that can be located on the interior portion of a jamb, providing better through the air connection than other products mounted to an exterior wall.

Figure 14:
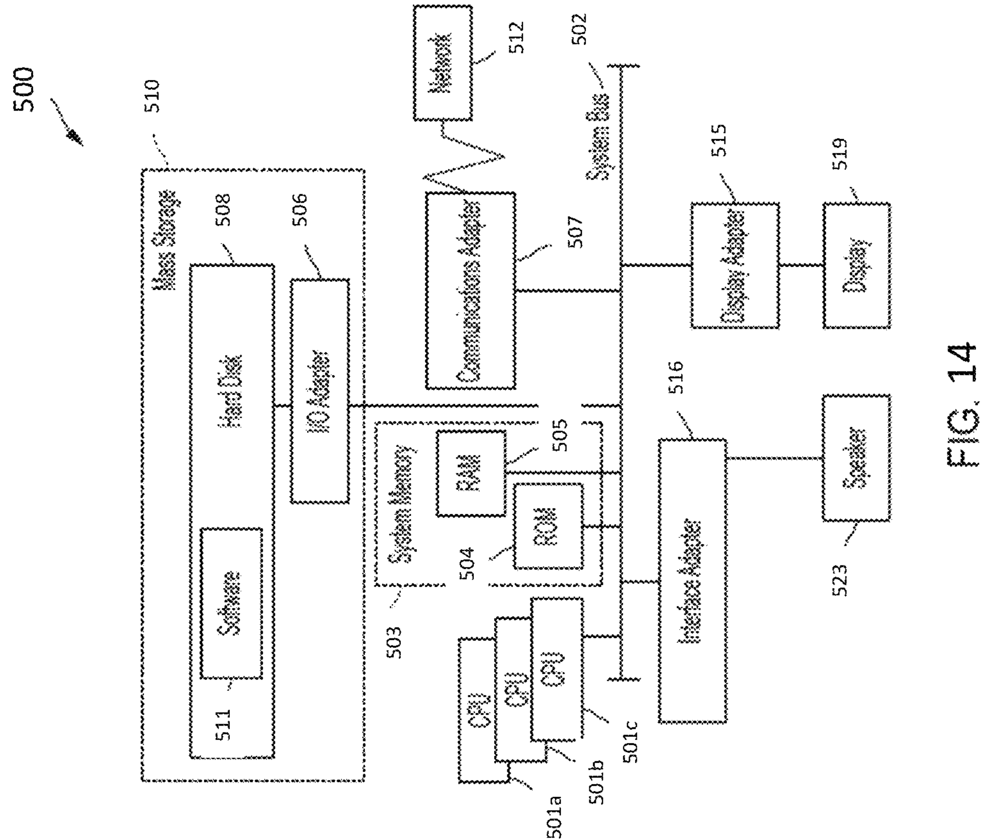
FIG. 14 is a diagram of an exemplary computer system.

Turning now to FIG. 14, an exemplary computer system 500 is generally shown in accordance with an aspect for the door system. The computer system 500 can be an electronic computer framework comprising and/or employing any number and combination of computing devices and networks utilizing various communication technologies, as described herein. The computer system 500 can be easily scalable, extensible, and modular, with the ability to change to different services or reconfigure some features independently of others. The computer system 500 may be, for example, a server, desktop computer, laptop computer, tablet computer, or smartphone. In some examples, computer system 500 may be a cloud computing node. Computer system 500 may be described in the general context of computer-executable instructions, such as program modules, being executed by a computer system. Generally, program modules may include routines, programs, objects, components, logic, data structures, and so on that perform particular tasks or implement particular abstract data types. Computer system 500 may be practiced in distributed cloud computing environments where tasks are performed by remote processing devices that are linked through a communications network. In a distributed cloud computing environment, program modules may be located in both local and remote computer system storage media, including memory storage devices.

As shown in FIG. 14, the computer system 500 has one or more central processing units (CPU(s)) 501*a*, 501*b*, 501*c*, etc. (collectively or generically referred to as processor(s) 501). The processors 501 can be a single-core processor, multi-core processor, computing cluster, or any number of other configurations. The processors 501, also referred to as processing circuits, are coupled via a system bus 502 to a system memory 503 and various other components. The system memory 503 can include one or more memory devices, such as read-only memory (ROM) 504 and a random-access memory (RAM) 505. The ROM 504 is coupled to the system bus 502 and may include a basic input/output system (BIOS), which controls certain basic functions of the computer system 500. The RAM is read-write memory coupled to the system bus 502 for use by the processors 501. The system memory 503 provides temporary memory space for operations of said instructions during operation. The system memory 503 can include random access memory (RAM), read-only memory, flash memory, or any other suitable memory systems.

The computer system 500 comprises an input/output (I/O) adapter 506 and a communications adapter 507 coupled to the system bus 502. The I/O adapter 506 may be a small computer system interface (SCSI) adapter that communicates with a hard disk 508 and/or any other similar component. The I/O adapter 506 and the hard disk 508 are collectively referred to herein as a mass storage 510.

Software 511 for execution on the computer system 500 may be stored in the mass storage 510. The mass storage 510 is an example of a tangible storage medium readable by the processors 501, where the software 511 is stored as instructions for execution by the processors 501 to cause the computer system 500 to operate, such as is described hereinbelow and with respect to the various Figures. Examples of computer program product and the execution of such instruction is discussed herein in more detail. The communications adapter 507 interconnects the system bus 502 with a network 512, which may be an outside network, enabling the computer system 500 to communicate with other such systems. In one aspect, a portion of the system memory 503 and the mass storage 510 collectively store an operating system, which may be any appropriate operating system to coordinate the functions of the various components shown in FIG. 14.

Additional input/output devices are shown as connected to the system bus 502 via a display adapter 515 and an interface adapter 516 and. In one aspect, the adapters 506, 507, 515, and 516 may be connected to one or more I/O buses that are connected to the system bus 502 via an intermediate bus bridge (not shown). A display 519 (e.g., a screen or a display monitor) is connected to the system bus 502 by a display adapter 515, which may include a graphics controller to improve the performance of graphics-intensive applications and a video controller. A keyboard, a mouse, a touchscreen, one or more buttons, a speaker, etc., can be interconnected to the system bus 502 via the interface adapter 516, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 14, the computer system 500 includes processing capability in the form of the processors 501, and storage capability including the system memory 503 and the mass storage 510, input means such as the buttons, touchscreen, and output capability including the speaker 523 and the display 519.

In some aspects, the communications adapter 507 can transmit data using any suitable interface or protocol, such as the internet small computer system interface, among others. The network 512 may be a cellular network, a radio network, a wide area network (WAN), a local area network (LAN), or the Internet, among others. An external computing device may connect to the computer system 500 through the network 512. In some examples, an external computing device may be an external web server or a cloud computing node.

It is to be understood that the block diagram of FIG. 14 is not intended to indicate that the computer system 500 is to include all of the components shown in FIG. 14. Rather, the computer system 500 can include any appropriate fewer or additional components not illustrated in FIG. 14 (e.g., additional memory components, embedded controllers, modules, additional network interfaces, etc.). Further, the aspects described herein with respect to computer system 500 may be implemented with any appropriate logic, wherein the logic, as referred to herein, can include any suitable hardware (e.g., a processor, an embedded controller, or an application-specific integrated circuit, among others), software (e.g., an application, among others), firmware, or any suitable combination of hardware, software, and firmware, in various aspects.

Exemplary aspects of technical solutions described herein relate to, among other things, devices, systems, methods, computer-readable media, techniques, and methodologies for using or managing computer interfaces for smart doors to allow for peripheral device or component configuration, update, etc.

A computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source-code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to aspects of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various aspects of the present invention have been presented for purposes of illustration but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects described herein.

Various aspects of the invention are described herein with reference to the related drawings. Alternative aspects of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains," or "containing," or any other variation thereof are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any aspect or design described herein as "exemplary" is not necessarily to be construed as preferred or advantageous over other aspects or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, smart door systems.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

What is claimed is:

1. A door, comprising:

a door slab, wherein the door slab includes at least one hollow cavity housing a plurality of at least partially internal devices or components, the devices or components including plural electrical devices or components, and wherein a process operatively connected to a controller is configured to provide a first user interface configured to provide selectable settings for at least one device or component configured to provision at least one hardware component for at least one ecosystem partner and allowing for customization thereof according to the requirements of the at least one ecosystem partner or a user, wherein the controller is configured to switch the at least one hardware component from a first ecosystem partner to a second ecosystem partner by updating firmware of the at least one hardware component without replacing the at least one hardware component, and wherein the first user interface provides a centralized door system interface that allows a user to interact with plural devices provisioned for plural ecosystem partners without requiring separate applications for each of the plural ecosystem partners.

2. A door in accordance with claim 1, wherein the plural devices or components is two or more of: an electronic access control; a door state sensor; an entry camera with video; an audio communication unit; an audio or video doorbell; a digital camera; a light; a motion detector or sensor; a proximity sensor; a door opener; heating and cooling thermostat controls; alarm sensor or controls; lighting; household or automobile batteries; or automotive controls.

3. A door in accordance with claim 1, wherein the first user interface is configured according to a first ecosystem partner software that is connected to the controller via internet connectivity.

4. A door in accordance with claim 1, wherein the first user interface is in communication with the first ecosystem partner software via a first ecosystem server in communication with the controller via a communications network.

5. A door in accordance with claim 4, wherein at least two configuration settings are displayed in the first user interface according to first ecosystem partner specifications.

6. A door in accordance with claim 4, wherein the first user interface is configured to communicate selections made in the first user interface to the first ecosystem partner server via the communications network.

7. A door in accordance with claim 6, wherein the first user interface establishes settings for the at least one device to operatively connect the at least one device to the first ecosystem partner, allowing operability of the at least one device through services provided by the first ecosystem partner.

8. A door in accordance with claim 7, further comprising a second ecosystem partner, a second ecosystem server, a second user interface and a second device, wherein the second user interface establishes settings for the second device to operatively connect the second device to the second ecosystem partner, allowing operability of the second device through services provided by the second ecosystem partner.

9. A door in accordance with claim 8, further comprising a third ecosystem partner, a third ecosystem server, a third user interface and a third device, wherein the third user interface establishes settings for the third device to operatively connect the third device to the third ecosystem partner, allowing operability of the third device through services provided by the third ecosystem partner.

10. A door in accordance with claim 7, wherein the at least one device comprises a discrete component of the overall device associated with the at least one device.

11. A door in accordance with claim 10, wherein the discrete component comprises one or more of: a camera unit, a microphone, a locking or latching component, a lighting component, an access component, and an alarm or security component.

12. A door in accordance with claim 1, wherein the controller is further configured to connect to an IoT ecosystem cloud server of the at least one ecosystem partner to pull data for at least one of installation, configuration, or update of the at least one hardware component.

13. A door in accordance with claim 1, wherein the controller is configured to automatically recognize the at least one hardware component and automatically provision the at least one hardware component for the at least one ecosystem partner.

14. A door in accordance with claim 1, wherein the controller is configured to update firmware of the at least one hardware component to provision the at least one hardware component for the at least one ecosystem partner, and wherein the firmware update enables the at least one hardware component to communicate with a server of the at least one ecosystem partner.

15. A door in accordance with claim 1, wherein the at least one hardware component includes core firmware programmed therein, and wherein the controller is configured to update the core firmware to enable compatibility with the at least one ecosystem partner.

16. A door in accordance with claim 1, wherein the controller is configured to automatically detect a need for update of the at least one hardware component for operability or improvement with the at least one ecosystem partner, and automatically initiate provisioning of the at least one hardware component.

17. A door in accordance with claim 1, wherein the at least one hardware component comprises a camera component, and wherein the first user interface is configured to provide custom settings for the camera component including at least one of color settings, hue settings, frame rate settings, and camera function settings, wherein the custom settings are configured to be compatible with requirements of the at least one ecosystem partner.

18. A door in accordance with claim 1, wherein the at least one hardware component is configured to be removably inserted into a slot in the door slab, wherein insertion of the at least one hardware component into the slot automatically connects the at least one hardware component to a wiring harness or pin connector, and wherein the controller is configured to automatically recognize the at least one hardware component upon connection and to access an IoT ecosystem to pull data to enable the at least one hardware component.

19. A door in accordance with claim 1, wherein the controller is configured to update firmware of the at least one hardware component according to brand requirements of the at least one ecosystem partner to enable operability of the at least one hardware component with services provided by the at least one ecosystem partner.

* * * * *